US008247153B2

(12) United States Patent
Matsuoka et al.

(10) Patent No.: US 8,247,153 B2
(45) Date of Patent: Aug. 21, 2012

(54) PROCESS FOR PRODUCING RESIN MICROPARTICLES FOR A TONER RAW MATERIAL

(75) Inventors: Hiroshi Matsuoka, Sodegaura (JP); Ichirou Sasaki, Sodegaura (JP); Toshimitsu Narutaki, Sodegaura (JP); Masaru Wakizaka, Sodegaura (JP); Hiroyuki Takei, Sodegaura (JP)

(73) Assignee: Mitsui Chemicals, Inc., Minato-Ku, Tokyo (JP)

( * ) Notice: Subject to any disclaimer, the term of this patent is extended or adjusted under 35 U.S.C. 154(b) by 0 days.

(21) Appl. No.: 12/236,114

(22) Filed: Sep. 23, 2008

(65) Prior Publication Data

US 2009/0020900 A1 Jan. 22, 2009

Related U.S. Application Data

(62) Division of application No. 10/575,728, filed as application No. PCT/JP2004/015352 on Oct. 18, 2004, now abandoned.

(30) Foreign Application Priority Data

Oct. 16, 2003 (JP) ................................ 2003-357106
Mar. 22, 2004 (JP) ................................ 2004-082516
Aug. 3, 2004 (JP) ................................ 2004-226253

(51) Int. Cl.
*B29B 9/12* (2006.01)

(52) U.S. Cl. ........... 430/137.1; 430/137.18; 430/137.19; 264/9

(58) Field of Classification Search ............... 430/137.1, 430/137.418, 137.19, 137.18; 264/9, 12, 264/141, 142, 143, 148, 211, 211.23; 528/499; 524/601, 604; 428/402
See application file for complete search history.

(56) References Cited

U.S. PATENT DOCUMENTS

| | | | | |
|---|---|---|---|---|
| 5,298,355 | A | 3/1994 | Tyagi et al. | |
| 5,593,807 | A | 1/1997 | Sacripante et al. | |
| 5,691,095 | A | 11/1997 | Shinzo et al. | |
| 6,168,896 | B1 * | 1/2001 | Matsuoka et al. | 430/137.1 |
| 6,194,115 | B1 | 2/2001 | Nagase et al. | |
| 6,207,339 | B1 | 3/2001 | Kato et al. | |
| 6,627,681 | B1 | 9/2003 | Ueda et al. | |
| 6,673,502 | B2 | 1/2004 | Takahashi et al. | |
| 7,323,503 | B2 * | 1/2008 | Kawahara et al. | 524/127 |
| 2002/0037468 | A1 | 3/2002 | Matsushima et al. | |
| 2002/0064723 | A1 * | 5/2002 | Nanya et al. | 430/108.22 |
| 2002/0076639 | A1 * | 6/2002 | Uno et al. | 430/137.1 |
| 2002/0110745 | A1 | 8/2002 | Ohmura et al. | |
| 2003/0087176 | A1 | 5/2003 | Ezenyilimba et al. | |
| 2003/0124448 | A1 * | 7/2003 | Shinzo et al. | 430/109.4 |

FOREIGN PATENT DOCUMENTS

| | | | |
|---|---|---|---|
| EP | 0 827 036 | A1 | 3/1998 |
| EP | 1 096 326 | A2 | 5/2001 |
| EP | 1280011 | A2 | 7/2002 |
| EP | 1280011 | A3 | 7/2002 |
| JP | 09-274335 | A | 10/1997 |
| JP | 10-139884 | A | 5/1998 |
| JP | 2002-049180 | A | 2/2002 |
| JP | 2002-351140 | A | 12/2002 |
| TW | 201765 | | 3/1993 |
| TW | 518453 | | 1/2003 |
| TW | 556059 | | 10/2003 |

OTHER PUBLICATIONS

Supplementary European Search Report issued in corresponding European Application No. 04 79 2521 dated Feb. 2, 2010.

* cited by examiner

*Primary Examiner* — Mark F Huff
*Assistant Examiner* — Rachel Zhang
(74) *Attorney, Agent, or Firm* — Buchanan Ingersoll & Rooney PC

(57) ABSTRACT

An object of the present invention is to provide a resin microparticle for a toner raw material that has a small particle diameter and a narrow particle diameter distribution and has a low odor.

There are provided a resin microparticle for a toner raw material characterized in that all of the following requirements (i) to (iii) are satisfied:

Requirement (i): A particle diameter of 50% volume (D50) satisfies the relationship 0.05 μm≦D50≦1 μm;

Requirement (ii): A particle diameter of 10% volume (D10) and a particle diameter of 90% volume (D90) satisfy the relationship D90/D10≦7; and Requirement (iii): The content of an organic solvent is not more than 70 ppm.

6 Claims, No Drawings

PROCESS FOR PRODUCING RESIN MICROPARTICLES FOR A TONER RAW MATERIAL

CROSS REFERENCE TO RELATED APPLICATION

This application is a divisional of application Ser. No. 10/575,728, filed Apr. 13, 2006, which is a §371 of PCT/JP2004/15352, filed Oct. 18, 2004, which in turn claims priority to Japanese Application Nos. 2003-357106, filed Oct. 16, 2003; 2004-082516, filed Mar. 22, 2004; and 2004-2265253, filed Aug. 3, 2004, the disclosures of all of which are incorporated herein by reference in their entirety.

TECHNICAL FIELD

The present invention relates to a resin microparticle for a toner raw material which has a uniform particle shape and form, an aqueous dispersed system having a microparticle in a disperse phase, and a toner comprising the microparticle.

BACKGROUND ART

As production method of a toner for electrostatic development, a kneading and grinding method has been widely used. A toner for electrostatic development obtained by that method tends to has a wide particle size distribution and has a lot of coarse powders and fine powders. Therefore, it is pointed out that the deterioration of image quality and a carrier pollution by the toner easily occur. Furthermore, for producing a toner having a small particle diameter and a narrow particle size distribution by the kneading and grinding method, much energy may be required in some cases.

As a method for producing an aqueous dispersed system of a resin microparticle, a method using a twin screw extruder has been disclosed (refer to Patent Document 1). That is a method comprising dissolving a polyester resin in an organic solvent to have a viscosity capable of emulsification and adding water thereto for the phase inversion emulsification. Since that method employs an organic solvent, a process for removing such a solvent is troublesome and there is also a problem of economical efficiency. Further, it is difficult to completely remove an organic solvent from the aqueous dispersed system. Therefore, there are problems of environmental contamination, safety, odor and the like caused by the organic solvent.

Meanwhile, there has also been proposed a method comprising melting a raw material for a toner comprising a polyester resin, adding water to the melted product for the phase inversion emulsification to form a resin microparticle, and agglomerating and fusing the formed resin microparticle to obtain a toner (refer to Patent Document 2). In the Patent Document 2, a microparticle having a particle diameter of not less than 2.4 μm before fusion has only been disclosed. In that method, since a particle diameter of the microparticle before fusion is big, there has been a problem that it is not possible to obtain a resin microparticle having physical properties that the present inventors have targeted.

Patent Document 1: JP1998-139884A

Patent Document 2: JP2002-351140A

DISCLOSURE OF THE INVENTION

Problems to be Solved by the Invention

An object of the present invention is to provide a resin microparticle for a toner raw material that has a small particle diameter and a narrow particle diameter distribution, having low odor. Furthermore, the invention is to provide a toner comprising the resin microparticle and an aqueous dispersed system of the resin microparticle.

Means for Solving the Problem

In order to achieve the above objects, the present inventors have conducted an extensive study. As a result, they have found that a resin is melted and mixed in the presence of water to form a resin microparticle for a toner and the thus-formed resin microparticle has excellent performance. Thus, the present invention has been completed.

That is, the present invention relates to:

(1) a resin microparticle (A) for a toner raw material satisfying all of the following requirements (i) to (iii):

Requirement (i): A particle diameter of 50% volume (D50) satisfies the relationship 0.05 μm≦D50≦1 μm;

Requirement (ii): A particle diameter of 10% volume (D10) and a particle diameter of 90% volume (D90) satisfy the relationship D90/D10≦7; and Requirement (iii): The content of an organic solvent is not more than 70 ppm;

(2) an aqueous dispersed system comprising the above resin microparticle (A) for a toner raw material dispersed in water; and (3) a toner comprising the above resin microparticle (A) for a toner raw material.

Effect of the Invention

The resin microparticle according to the present invention has a particle diameter of 50% volume (D50) of 0.05 μm≦D50≦1 μm so that a component such as a dye or a wax is satisfactorily dispersed in the preparation of a toner. Further, the resin microparticle has the relationship of a particle diameter of 10% volume (D10) and a particle diameter of 90% (D90) of D90/D10≦7 so that a toner obtained from the resin microparticle does not contaminate a carrier, thus resulting in obtaining excellent image quality. Further, the resin microparticle has the content of an organic solvent of not more than 70 ppm so that a toner obtained from the resin microparticle produces low order. Thus, the toner is preferable from the viewpoint of working environment as well. Therefore, the resin microparticle of the present invention can be suitably used for a toner raw material.

BEST MODE FOR CARRYING OUT THE INVENTION

The present invention will be described in more detail below.

In the present invention, a particle diameter of 50% volume (D50) of the resin microparticle (A) for a toner raw material is 0.05 μm≦D50≦1 μm, and preferably 0.1 μm≦D50≦0.7 μm. Furthermore, the relationship between a particle diameter of 10% volume (D10) and a particle diameter of 90% volume (D90) of the resin microparticle (A) for a toner raw material is D90/D10≦7, and preferably D90/D10≦4.5. When the particle diameter of the resin microparticle (A) is within the above range, a toner having a small particle diameter distribution can be obtained in the preparation of a toner using such a microparticle. Furthermore, dispersability of a component such as a colorant, a releasing agent, a charge controlling agent or the like in the toner becomes good so that compositions between toners become homogeneous. Thus, performance or reliability as a toner is stable.

In the present invention, the content of an organic solvent in the resin microparticle (A) for a toner raw material is not more than 70 ppm and preferably not more than 30 ppm. When the content of the organic solvent in the resin microparticle (A) is within the above range, a toner without having problems of environmental contamination or odor can be obtained. In case the organic solvent remains in the toner, a low molecular weight component in the toner particle or a non-polar component such as a wax having a low melting point is considered to be conveyed to a surface of the toner particle with volatilizing the organic solvent gradually. For this reason, the deterioration in storage stability or development properties of the toner easily takes place. However, the toner according to the present invention does not practically contain an organic solvent so that a toner with excellent storage stability (anti-blocking properties) and development stability can be obtained.

In the present invention, an organic solvent is not restricted as far as it is volatile. Concrete examples thereof include aromatic hydrocarbon solvents such as toluene, xylene, ethylbenzene, tetralin and the like; aliphatic or alicyclic hydrocarbon type solvent such as n-heptane, n-hexane, cyclohexane and the like; halogen series solvents such as methylene dichloride, carbon tetrachloride and the like; ester or ester ether solvents such as ethyl acetate, butyl acetate, methylcellosolve acetate and the like; ether solvents such as diethyl ether, tetrahydrofuran and the like; ketone solvents such as acetone, methylethyl ketone and the like; and alcohol solvents such as methanol, ethanol, isopropanol, n-butanol, benzyl alcohol and the like.

In the present invention, the aqueous dispersed system comprising the resin microparticle (A) for a toner raw material dispersed in water can be preferably produced by melt-mixing a resin in the presence of water. A method for melt-mixing is not particularly restricted, but an extruder is preferably used from the viewpoint that the resin can be heated up to not less than the plasticizing temperature of the resin and the resin can be mechanically mixed sufficiently. A twin screw extruder capable of carrying out melt-mixing and phase inversion is particularly preferable. Furthermore, a twin screw extruder with a water inlet placed at a vent section is preferable from the viewpoint that melt-mixing and phase inversion can be continuously carried out.

The preferred range of a temperature for carrying out melt-kneading is different depending on the melting temperature of a resin. However, it is preferably from 80° C. to 180° C. from the viewpoint of kneading efficiency. It is more preferably from 80° C. to 170° C. and further preferably from 80° C. to 155° C. When melt-kneading is carried out in the above temperature range, the resin can be fully mixed and decomposition of the resin can be prevented.

In case the dispersed system of the present invention is produced by using a twin screw extruder, it is preferable that a single screw extruder is placed at an outlet of the above extruder to pass the dispersed system through the single screw extruder for cooling it down to not more than 100° C.

In the present invention, when water is fed, the amount of water is preferably from 5 mass % to 50 mass % and more preferably from 10 mass % to 30 mass % in the total amount of a polyester type resin (B) and water. The amount of water within the above range is preferable from the viewpoint that a resin microparticle satisfying the relationships of D10 and D90 of $D90/D10 \leqq 7$ and D50 of $0.05\ \mu m \leqq D50 \leqq 1\ \mu m$ can be easily obtained.

In the present invention, ion exchange water is suitably used for water, whereas a basic aqueous solution may be used as well. Preferable examples of the basic aqueous solutions may include the aqueous solution of the substances worked as bases such as alkali metals, alkali earth metals, ammonia, oxides of alkali metals and alkali earth metals, hydroxides and the like. More preferred examples thereof may include aqueous solutions of sodium oxide, sodium peroxide, potassium oxide, potassium peroxide, strontium oxide, barium oxide, sodium hydroxide, potassium hydroxide, calcium hydroxide, strontium hydroxide, barium hydroxide and the like. A concentration of the basic aqueous solution is preferably not more than 1N and more preferably not more than 0.5N.

In the production method of the present invention, by changing the conditions such as the thermal fusion time and temperature after aggregation a toner having an uneven surface, a toner having a slightly dissimilar shape compared to the complete spherical shape, and the like may be produced. Thus, the toner shape can be controlled flexibly. Therefore, a toner with excellent cleaning properties can be produced.

In the present invention, the term “polymerization” may include the meaning of copolymerization, and the term “polymer” may have the meaning of a copolymer.

A resin contained in the resin microparticle (A) for a toner raw material used in the present invention is not particularly restricted as far as it is easily dissolved in water or a basic aqueous solution. Any of resins which have been conventionally used as a resin for toner can be suitably used. Examples thereof include a polyether polyol based resin, a polyester based resin, a styrene based resin, an acryl based resin and the like. Among these resins, a polyester based resin (B) and a polyether polyol based resin (D) are particularly preferable.

The polyester based resin (B) is excellent in offset resistance, durability, low-temperature fixing properties and the like in the case of using it as a toner. In the present invention, the polyester based resin (B) is a resin (polyester resin (a)) obtained by carrying out polycondensation of at least one kind of a polyhydric alcohol and at least one kind of a polycarboxylic acid as main components. Furthermore, the polyester based resin (B) in the present invention includes a urethane modified polyester resin (a1) obtained by reacting the polyester resin (a) and a polyisocyanate (b) as well. The primary structure of the polyester based resin (B) is not particularly restricted. Any of a linear resin, a branched resin or a crosslinked resin can be used.

Examples of the polyhydric alcohols which are used as a raw material of the polyester resin (a) include dihydric alcohols such as aromatic diols, aliphatic diols, alicyclic diols, and tri- or higher polyhydric alcohol. Examples of the aromatic diols include o-xylylene glycol, p-xylylene glycol, m-xylylene glycol, ethylene oxide adducts of bisphenol A, propylene oxide adducts of bisphenol A and the like. Examples of ethylene oxide adducts of bisphenol A include polyoxyethylene-(2,0)-2,2-bis(4-hydroxyphenyl)propane and the like. Examples of propylene oxide adducts of bisphenol A include, polyoxypropylene-(2,0)-2,2-bis(4-hydroxyphenyl)propane, polyoxypropylene-(1,2)-2,2-bis(4-hydroxyphenyl)propane, polyoxypropylene-(1,1)-2,2-bis(4-hydroxyphenyl)propane, polyoxypropylene-(2,2)-polyoxyethylene(2,0)-2,2-bis(4-hydroxyphenyl)propane, polyoxypropylene-(6)-2,2-bis(4-hydroxyphenyl)propane, polyoxypropylene-(3,3)-2,2-bis(4-hydroxyphenyl)propane and the like. Examples of the aliphatic diols include ethylene glycol, diethylene glycol, 1,2-propanediol, 1,3-propanediol, triethylene glycol, 1,3-butanediol, 2,3-butanediol, 1,4-butanediol, 1,5-pentanediol, neopentyl glycol, dipropylene glycol, 1,6-hexanediol, 2-ethyl-1,3-hexanediol and the like. Examples of the alicyclic diols include dihydroxymethyl cyclohexane, hydrogenated bisphenol A and the like. Among these compounds, preferable are ethylene oxide adducts of bisphenol A, propylene oxide adducts of bisphenol A, diethylene glycol, triethylene glycol, ethylene glycol and neopentyl glycol. More preferable are propylene oxide adducts of bisphenol A triethylene glycol, ethylene glycol and neopentyl glycol.

Examples of the polycarboxylic acid which is used as a raw material of the polyester resin (a) include aliphatic saturated dicarboxylic acids, aliphatic unsaturated dicarboxylic acids and aromatic dicarboxylic acids. Furthermore, they include anhydrides of the above various dicarboxylic acids or dicarboxylic acids of lower alkyl esters having 1 to 6 carbon atoms. Examples of the aliphatic saturated dicarboxylic acids include malonic acid, succinic acid, glutaric acid, adipic acid, azelaic acid, sebacic acid and the like. Examples of the aliphatic unsaturated dicarboxylic acids, include maleic acid, fumaric acid, citraconic acid, itaconic acid and the like. Examples of aromatic dicarboxylic acids include phthalic acid, terephthalic acid, isophthalic acid, 1,5-naphthalic acid and the like. Examples of anhydrides of the above various dicarboxylic acids include succinic anhydride, maleic anhydride, phthalic anhydride and the like. Examples of the lower alkyl esters having 1 to 6 carbon atoms of the above various dicarboxylic acids include dimethyl succinate, diethyl maleate, dihexyl phthalate and the like. Among these, preferably used are adipic acid, terephthalic acid and isophthalic acid, while more preferably used are terephthalic acid and isophthalic acid.

Furthermore, as a raw material of the polyester resin (a), tri- or higher polyhydric alcohol, tri- or higher polycarboxylic acid and anhydrides thereof can also be used as needed. Examples of the tri- or higher polyhydric alcohols include glycerin, 2-methylpropanetriol, trimethylolpropane, trimethylolethane, sorbitol, sorbitan and the like. Examples of the tri- or higher polycarboxylic acids include trimellitic acid, pyromellitic acid and the like.

It is also possible to use a monocarboxylic acid and a monohydric alcohol. Examples of the monocarboxylic acids include aliphatic monocarboxylic acids having a straight chained structure, a branched structure an unsaturated structure and aromatic monocarboxylic acids. Examples of the aliphatic monocarboxylic acid include octanoic acid, decanoic acid, dodecanoic acid, myristic acid, palmitic acid, stearic acid and the like. Examples of the aromatic monocarboxylic acids include benzoic acid, naphthalenecarboxylic acid and the like. Aliphatic monohydric alcohols such as octanol, decanol, dodecanol, myristyl alcohol, palmityl alcohol, stearyl alcohol and the like can also be used. Preferable are glycerin, trimethylolpropane, stearic acid, trimellitic acid and benzoic acid. More preferable are trimethylolpropane, stearic acid and benzoic acid.

By using these compounds, the molecular weight and glass transition temperature (Tg) of the polyester resin (a) can be controlled, and also a branched structure can be introduced. In particular, to obtain a urethane modified polyester resin (a1) which is crosslinked or polymerized with a polyisocyanate to be described later (hereinafter, described as urethane-extending in some cases), as a raw material of the polyester resin (a), one or more kinds of tri- or higher polyhydric alcohols are preferably used from the viewpoint of effective polymerization.

The amount of the tri- or higher polyhydric alcohol is preferably in the range of 0.25 mole % to 25 mole % and more preferably in the range of 0.5 mole % to 20 mole % in the total alcohol components, raw materials of the polyester resin (a) (total amount of diol and tri- or higher polyhydric alcohol). The amount of the tri- or higher polyhydric alcohol within the above range is preferable in that polycondensation reaction properly takes place during urethane-extending of the polyester resin (a), thus enhancing offset resistance or durability of the toner.

The temperature of polycondensation reaction is generally from 150° C. to 300° C., preferably from 180° C. to 270° C. and more preferably from 200° C. to 250° C. The reaction temperature within the above range is preferable in that the polyester resin (a) with good productivity can be obtained within a short period of time without causing decomposition of the resin.

In the polycondensation reaction, the addition of a catalyst is preferable because the reaction proceeds rapidly. As the catalyst, known catalysts for use in the polycondensation reaction can be used. Examples thereof include catalysts containing elements such as tin, antimony titanium, germanium, aluminum and the like. Examples of the catalysts containing tin include dibutyltin oxide and the like. Examples of the catalysts containing antimony include antimony trioxide and the like. As the catalyst containing titanium, titanium alkoxide, titanium acylate, titanium chelate and the like can be more preferably used, and tetra-n-butyl titanate, tetra(2-ethylhexyl)titanate, tetramethyl titanate and tetraisopropyl titanate are particularly preferably used. Examples of the catalysts containing germanium include germanium dioxide and the like.

The amount of the catalyst added is preferably from 0.01 mass part to 1.00 mass part per 100 mass parts of a monomer. The above catalyst may be used singly or in combination. Further, the catalyst may be added at the beginning or in the middle of polymerization.

To produce the urethane modified polyester resin (a1), the hydroxyl value of the polyester resin (a) to be reacted with the polyisocyanate (b) is preferably from 5 KOHmg/g to 100 KOHmg/g and more preferably from 5 KOHmg/g to 80 KOHmg/g. The hydroxyl value within the above range is preferable from the viewpoint of proper reactivity in urethane extending of the polyester resin (a). For that reason, gel portion in the resin becomes proper so that both good offset resistance and fixing properties can be exhibited; therefore the above range is preferable. The hydroxyl value refers to mg of potassium hydroxide necessary to neutralize the acid anhydride necessary to esterify the hydroxyl group present in 1 g of the resin.

To produce the urethane modified polyester resin (a1), the acid value of the polyester resin (a) to be reacted with the polyisocyanate (b) is preferably not more than 100 KOHmg/g and more preferably from 1 KOHmg/g to 80 KOHmg/g. The acid value within the above range is preferable from the viewpoint that the toner exhibits excellent electrification stability. The acid value in the present invention refers to mg of potassium hydroxide necessary to neutralize 1 g of the resin.

The number-average molecular weight (Mn) of the THF soluble component of the polyester resin (a) is preferably from 1,000 to 50,000, more preferably from 1,000 to 20,000, and further preferably from 1,500 to 8,000. The number-average molecular weight within the above range is preferable from the viewpoint that excellent offset resistance, durability and fixing properties of the toner can be obtained.

It is preferable that the THF soluble component of the polyester resin (a) has at least one peak in the range of 3,000 to 10,000 molecular weight in the molecular weight distribution measured by the gel permeation chromatography (GPC). This is preferable because fixing properties and gloss of the toner becomes excellent.

A glass transition temperature (Tg) of the polyester resin (a) is preferably from 30° C. to 80° C. and more preferably from 40° C. to 70° C. Tg within the above range is preferable from the viewpoint that a toner exhibiting good storage stability and fixing properties can be obtained.

In the present invention, the polyester based resin (B) may be used together with two kinds or more polyester resins (a). In that case, even when characteristics of respective acid values or hydroxyl values are out of the above range, those of the whole polyester based resin (B) are preferably within the above range.

The polyester based resin (B) of the present invention contains the THF insoluble component in an amount of from 0.3 mass % to 20 mass % and more preferably in an amount of from 0.5 mass % to 10 mass %. The THF insoluble component within the above range is preferable because sufficient offset resistance and fixing properties can be obtained.

It is preferable that the THF insoluble component of the polyester based resin (B) in the present invention contains a polyisocyanate-derived structure unit. The structure unit is obtained by, for example, reacting a hydroxyl group of the polyester resin (a) with the polyisocyanate (b). Therefore, the polyester resin (a) and polyisocyanate (b) are preferably used in an amount of from 0.1 mole part to 2.5 mole parts and more preferably from 0.2 mole part to 2.0 mole parts of an isocyanate group of the polyisocyanate (b) for 1 mole part of the hydroxyl group of the polyester resin (a). When the amount of the polyisocyanate (b) is small, the toner does not exhibit sufficient offset resistance in some cases. When the amount of the polyisocyanate (b) is high, there is a problem of stability in some cases because unreacted polyisocyanate remains in the resin after the reaction.

Polyisocyanate (b) in the present invention is a compound having two or more isocyanate groups in a molecule. As the diisocyanate compound containing two isocyanate groups in a molecule, there can be exemplified, for example, alicyclic diisocyanate, alicyclic diisocyanate, aromatic diisocyanate, aralkyl diisocyanate and the like. Examples of the aliphatic diisocyanates include hexamethylene diisocyanate (HDI), tetramethylene diisocyanate and the like. Examples of the alicyclic diisocyanates include isophorone diisocyanate (IPDI), norbornene diisocyanate (NBDI), hydrogenated diphenylmethane diisocyanate and the like. As the aromatic diisocyanate, there can be exemplified, for example, tolylene diisocyanate (TDI), diphenylmethane diisocyanate (MDI) and the like. Examples of the aralkyl diisocyanate include xylylene diisocyanate (XDI) and the like.

Furthermore, polyisocyanates containing three or more isocyanate groups in a molecule such as polyphenylene polymethylene polyisocyanate (polymeric MDI) and the like can also be used. Also, modified polyisocyanates obtained by various modifications such as biuret modification, allophanate modification, isocyanurate modification, urethane modification and the like can be used. Among these, aromatic polyisocyanate is one of polyisocyanates which can be the most suitably used since it is highly reactive and cheap.

Preferred examples of methods for reacting the polyester resin (a) with the polyisocyanate (b) include the method comprising feeding the polyester resin (a) into a twin screw extruder for kneading, and then feeding the polyisocyanate (b) into the resin mixture during kneading and conveying for further melt-kneading. Examples of reactors used in the other method than those above include a single screw extruder, a static mixer and a usual reactor with a stirrer.

The reaction temperature is preferably in the range of 100° C. to 200° C. and more preferably in the range of 140° C. to 190° C. The reaction temperature within the above range is preferable since the resin is not pyrolytically decomposed and urethane extending reaction occurs sufficiently, thus resulting in obtaining offset resistance of a toner.

Furthermore, urethane extending of the polyester resin (a) may be carried out in the presence of a component selected from a colorant, a charge controlling agent, a releasing agent or the like. In addition, other resins such as a styrene-acrylic binder resin, a polyol based binder resin or the like can be contained as far as the characteristics are not damaged.

The amount and structure of the THF insoluble component are determined by using the resin microparticle obtained by drying a dispersed system with a resin microparticle for a toner dispersed therein at 150° C. for 2 hours and then cooled and solidified.

The structure of the toner binder resin can be analyzed by the combination of known analytical methods such as infrared spectroscopy (IR), ultraviolet spectroscopy nuclear magnetic resonance spectroscopy (NMR), liquid chromatography (LC), mass spectrometry (MS) resin hydrolysis, distillation and the like. Since the THF insoluble component is hardly dissolved in a solvent, a analytical method is a little restricted. However, the structure can be specified by carrying out thorough hydrolysis of the THF insoluble component and then separating by distillation or LC, and analyzing by the combination of methods such as gas chromatography (GC) as well as IR, NMR, LC and MS.

The polyester based resin (B) in the present invention is preferably a polyester based resin (B1) having a sulfonic acid group. In the present invention, the sulfonic acid includes its metal salt or ammonium salt.

Examples of the monomers having a sulfonic acid group and/or a sulfonic acid metal salt group which is used as a raw material of the polyester based resin (B) include sulfoisophthalic acid, 5-sulfoisophthalic acid, 4-sulfophthalic acid, 4-sulfonaphthalene-2,7-dicarboxylic acid, 5-(4-sulfophenoxy)isophthalic acid, 5-(sulfopropoxy)isophthalic acid, sulfopropyl malonic acid, sulfosuccinic acid, 2-sulfobenzoic acid, 3-sulfobenzoic acid, 5-sulfosalicylic acid and methyl esters of these carboxylic acids. Furthermore, metal salts such as lithium, natrium, kalium, magnesium, calcium, copper, iron or the like of these sulfonic acids, or ammonium salts are included.

A polyfunctional monomer containing a sulfonic acid group comprising at least one or more hydroxyl groups can also be used. The polyfunctional monomer is obtained by reacting glycidyl alcohols such as 2,3-epoxy-1-propanol, 3,4-epoxy-1-butanol or the like; difunctional epoxy such as ethylene glycol diglycidyl ether, diethylene glycol diglycidyl ether, triethylene glycol diglycidyl ether or the like; tri- or higher functional epoxy such as trimethylol propane triglycidyl ether or the like with acidic sulfite at 20° C. to 200° C. in the presence of a catalyst such as amine or imidazole as needed.

Among these, 5-sulfoisophthalic acid, sodium 5-sulfoisophthalic acid and sodium dimethyl 5-sulfoisophthalic acid are suitably used.

The amount of the monomer having a sulfonic acid group is preferably from 0.5 mole part to 8 mole parts and more preferably from 0.5 mole part to 4 mole parts per the total 100 mole parts of the polycarboxylic acid-derived structure unit and polyhydric alcohol-derived structure unit constituting the polyester based resin (B). The amount used is the same when the polyester based resin (B) is a polyester based resin (B11) having a vinyl copolymer-derived structure (C). The amount of the monomer having a sulfonic acid group and/or a sulfonic acid metal salt group within the above range is preferable because the particle diameter of 50% volume of the resin microparticle in a suspension becomes not more than 1 μm and toner storage stability becomes good when it is melt-mixed in the presence of water.

In the present invention, the polyester based resin (B) is also preferably a polyester based resin (B11) having a vinyl copolymer-derived structure (C).

The vinyl copolymer-derived structure (C) in the present invention is a portion derived from the corresponding vinyl copolymer (c). The content of the vinyl based copolymer-derived structure (C) is from 0.5 mass % to 10 mass %, and preferably from 0.5 mass % to 6 mass % in the polyester based resin (B11). The content of the vinyl copolymer-derived structure (C) within the above range is preferable in that a resin microparticle for a toner having a small particle diameter and a narrow particle diameter distribution can be easily obtained and also the releasing agent component can be dispersed well when it is used for a toner. Examples of methods for producing the polyester based resin (B11) include the method of urethane-extending of the melted mixture of the polyester resin (a) and vinyl based copolymer (c) and the method comprising urethane-extending only the polyester resin (a) and then adding the vinyl copolymer (c) thereto for melt-kneading again. The method of grounding each of the urethane-extended polyester resin (a1) and the vinyl copolymer (c) powders and mixing them is also included because the polyester resin (a1) and the vinyl polymer (c) are partly reacted while the mixed resin is kneaded in the presence of water. Among these methods, in consideration of dispersability of the vinyl copolymer (c) into the polyester resin (a), a method of urethane-extending of the melted mixture of the polyester resin (a) and vinyl copolymer (c) is preferable.

The vinyl copolymer (c) of the present invention is obtained by polymerizing at least one kind of a vinyl monomer.

As the polymerization method, known methods such as solution polymerization, bulk polymerization, suspension polymerization, emulsion polymerization or the like can be employed. However, a method comprising carrying out solution polymerization in an organic solvent and removing the solvent is preferably used from the viewpoint of its convenience. As the solvent for the solution polymerization, aromatic hydrocarbons such as benzene, toluene, ethylbenzene, o-xylene, m-xylene, p-xylene, cumene and the like are used. These can be used singly or in combination thereof, whereas the molecular weight can also be adjusted by the use of other solvent(s).

Any polymerization initiators can be usually used as far as they can be used as radical polymerization initiators Examples thereof include azo initiators such as 2,2'-azobisisobutyronitrile, 2,2'-azobis(4-methoxy-2,4-dimethylvaleronitrile), 2,2'-azobis(2,4-dimethylvaleronitrile), 2,2'-azobis (2-methylbutyronitrile), dimethyl-2,2'-azobisisobutyrate, 1,1'-azobis(1-cyclohexanecarbonitrile), 2-(carbamoylazo)-isobutyronitrile, 2,2'-azobis(2,4,4-trimethylpentane), 2-phenylazo-2,4-dimethyl-4-methoxyvaleronitrile, 2,2'-azobis(2-methylpropane) and the like; ketone peroxides such as methylethylketone peroxide, acetylacetone peroxide, cyclohexanone peroxide and the like; peroxy ketals such as 1,1-bis (t-butylperoxy)-3,3,5-trimethylcyclohexane, 1,1-bis(t-butylperoxy)cyclohexane, 2,2-bis(t-butylperoxy)butane and the like; hydroperoxides such as t-butyl hydroperoxide, cumene hydroperoxide, 1,1,3,3-tetramethylbutyl hydroperoxide and the like; dialkyl peroxides such as di-t-butyl peroxide, t-butylcumyl peroxide, dicumyl peroxide, 2,5-dimethyl-2,5-di(t-butylperoxy)hexane, α,α'-bis(t-butylperoxyisopropyl)benzene and the like; diacyl peroxides such as isobutyryl peroxide, octanoyl peroxide, decanoyl peroxide, lauroyl peroxide, 3,5,5-trimethylhexanoyl peroxide, benzoyl peroxide, m-toluoyl peroxide and the like; peroxydicarbonates such as diisopropyl peroxydicarbonate, di-2-ethylhexyl peroxydicarbonate, di-n-propyl peroxydicarbonate, di-2-ethoxyethyl peroxycarbonate, dimethoxyisopropyl peroxydicarbonate, di(3-methyl-3-methoxybutyl)peroxycarbonate and the like; sulfonyl peroxides such as acetylcyclohexyl sulfonyl peroxide and the like; and peroxyesters such as t-butyl peroxyacetate, t-butyl peroxyisobutyrate, t-butyl peroxyneodecanoate, cumyl peroxyneodecanoate, t-butyl peroxy-2-ethylhexanoate, t-butyl peroxy laurate, t-butyl peroxy benzoate, t-butyl peroxy isopropyl carbonate, di-t-butyldiperoxy isophthalate and the like. These compounds are used singly or in combination of two or more kinds. The type and amount of polymerization initiator can be suitably selected depending on the reaction temperature, concentration of the monomer and the like. The amount thereof is preferably from 0.01 weight part to 10 weight parts per 100 weight parts of the raw material monomer.

Examples of the vinyl monomers as a raw material of the vinyl copolymer (c) of the present invention include acrylic esters such as methyl acrylate, ethyl acrylate, propyl acrylate, butyl acrylate, octyl acrylate, cyclohexyl acrylate, lauryl acrylate, stearyl acrylate, benzyl acrylate, furfuryl acrylate, tetrahydrofurfuryl acrylate, ethoxyl acrylate, butoxyl acrylate, dimethylaminomethyl acrylate ester, dimethylaminoethyl acrylate ester and the like; methacrylic esters such as methyl methacrylate, ethyl methacrylate, propyl methacrylate, butyl methacrylate, octyl methacrylate, lauryl methacrylate, stearyl methacrylate, cyclohexyl methacrylate, benzyl methacrylate, furfuryl methacrylate, tetrahydrofurfuryl methacrylate, hydroxyethyl methacrylate, hydroxypropyl methacrylate, hydroxybutyl methacrylate, dimethylaminomethyl methacrylate ester, dimethylaminoethyl methacrylate ester and the like; aromatic vinyl monomers such as styrene, vinyl toluene, α-methylstyrene, chlorostyrene and the like; dialkyl esters of an unsaturated dibasic acid such as dibutyl maleate, dioctyl maleate, dibutyl fumarate, dioctyl fumarate and the like; vinyl esters such as vinyl acetate, vinyl propionate and the like; nitrogen-containing vinyl monomers such as acrylonitrile, methacrylonitrile, acrylamide, methacrylamide, N-substituted acrylamide, N-substituted methacrylamide and the like; divinyl compounds such as divinyl benzene, (poly)ethylene glycol diacrylate, (poly)ethylene glycol dimethacrylate and the like; conjugated diolefin unsaturated monomers such as butadiene, chloroprene, neoprene, isobutylene and the like; glycidyl group-containing vinyl monomers such as glycidyl acrylate, β-methyl glycidyl acrylate, glycidyl methacrylate, β-methyl glycidyl methacrylate and the like. These vinyl monomers are used singly or in combination of two or more kinds. Among these, particularly preferable examples of the vinyl monomer include styrenes, acrylic acids, methacrylic acids acrylic esters, methacrylic esters and glycidyl group-containing monomers.

The number-average molecular weight of the vinyl copolymer (c) of the present invention is preferably from 1,000 to 30,000 and more preferably from 3,000 to 25,000. The number-average molecular weight of the vinyl copolymer (c) within the above range is preferable from the viewpoints that a toner having good dispersability into the polyester based resin and a toner with good storage stability can be obtained.

The vinyl copolymer (c) preferably contains the glycidyl group-containing monomer in the range of 0.3 mole part to 13 mole parts per the total 100 mole parts of all vinyl monomers as a raw material. The range of 0.6 mole part to 13 mole parts is more preferable from the viewpoint of the dispersability of the vinyl copolymer into the polyester based resin.

The polyester based resin (B1) in the present invention is preferably a polyester based resin (B12) which does not include the bisphenol A-derived structure unit and contains not more than 5 ppm tin. In the present invention, the bisphenol A-derived structure unit is represented by the following formula (1).

[Chemical Formula 1]

Formula (1)

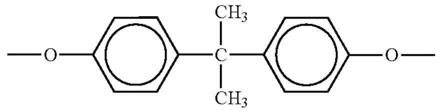

The bisphenol A-derived structure is not included in the polyester based resin (B12) from the viewpoint of reduced environmental burdens. Namely, polyhydric alcohols in the preparation of the polyester based resin (B12) do not include bisphenol A, bisphenol A-2 propylene oxide adducts, bisphenol A-3 propylene oxide adducts, bisphenol A polypropylene oxide adduct, bisphenol A-2 ethylene oxide adducts, bisphenol A-3 ethylene oxide adducts and bisphenol A polyethylene oxide adduct. In the present invention, the meaning of not including the bisphenol A-derived structure is that the bisphenol A-derived structure is preferably contained in an amount of not more than 0.5 mole part, and more preferably in an amount of 0 mole part, based on 100 mole parts of the total of the polycarboxylic acid-derived structure unit and the polyhydric alcohol-derived structure unit.

In the preparation of the polyester based resin (B12), a catalyst which is different from a catalyst containing tin or antimony, particularly a catalyst containing titanium is preferably used. Examples of the catalysts containing titanium include the aforementioned compounds.

Concrete product names of the aforementioned catalyst containing titanium include, though is not restricted to, Orgatics TA-25 (tetra-n-butyl titanate), TA-30 (tetra(2-ethylhexyl)titanate), TA-70 (tetramethyl titanate) and the like as titanium alkoxide; Orgatics TPHS (polyhydroxy titanium stearate) and the like as titanium acylate; and Orgatics TC-401 (titanium tetra acetylacetonate), TC-200 (titanium octylene glycolate), TC-750 (titanium ethyl acetoacetate), TC-310 (titanium lactate), TC-400 (titanium triethanol aminate) and the like as titanium chelate (all products are a product of Matsumoto Chemical Industry Co., Ltd.). The content of tin in the polyester based resin (B12) is not more than 5 ppm, preferably not more than 1 ppm, and more preferably 0 ppm from the viewpoint of reduced environmental burdens.

As a resin contained in the resin microparticle (A) for a toner raw material used in the present invention, a polyether polyol based resin (D) is preferable.

The polyether polyol based resin (D) used in the present invention also includes modified resins thereof. The polyether polyol based resin (D) can be obtained by reacting at least one kind (E) selected from bisphenols (i), polyhydric alcohols (ii), and reactants (iii) of the polyhydric alcohols and an acid anhydride, an epoxy resin (F), and a compound (G) having at least one active hydrogen in the molecule which can react with an epoxy group. In the preparation of the polyether polyol based resin (D), other components such as a crosslinking agent or the like can be added. Examples of the modified resins of the polyether polyol based resins (D) include a urethane modified polyether polyol based resin obtained by reacting a polyether polyol based resin and a polyisocyanate. The primary structure of these resins is not particularly restricted. Any of a linear resin, a branched resin or a crosslinked resin can be used. Furthermore, by mixing several kinds of polyol based resins, the molecular weight, molecular weight distribution or thermal characteristics can be adjusted. Known styrene based resins, styrene-acrylic copolymerized resins, polyester based resins can also be contained as far as the characteristics are not damaged.

Concrete examples of bisphenols (i) include 2,2-bis(4-hydroxyphenyl)propane [commonly called bisphenol A], bis(4-hydroxyphenyl)methane [commonly called bisphenol F], 1,1-bis(4-hydroxyphenyl)ethane [commonly called bisphenol AD], 1-phenyl-1,1-bis(4-hydroxyphenyl)methane, 1-phenyl-1,1-bis(4-hydroxyphenyl)ethane and the like.

Examples of the polyhydric alcohols (ii) include the polyhydric alcohols used as a raw material of the polyester based resin (B) or the like.

Examples of the acid anhydrides include phthalic anhydride, trimellitic anhydride, pyromellitic anhydride, ethylene glycol bistrimellitate, glycerol tristrimellitate, maleic anhydride, tetrahydrophthalic anhydride, methyltetrahydrophthalic anhydride, endomethylene tetrahydrophthalic anhydride, methylendomethylene tetrahydrophthalic anhydride, methylbutenyl tetrahydrophthalic anhydride, dodecenyl succinic anhydride, hexahydrophthalic anhydride, methylhexahydrophthalic anhydride, succinic anhydride, methylcyclohexene dicarboxylic anhydride, alkyl styrene-maleic anhydride copolymer, chlorendic anhydride, polyazelaic anhydride and the like.

The reaction of polyhydric alcohols and an acid anhydride can be preferably carried out in the presence of a catalyst at 80° C. to 150° C. for 1 hour to 8 hours. The reaction of the polyhydric alcohols and an acid anhydride may be carried out during the polyaddition for producing the resins or before the polyaddition. However, since an acid anhydride functions as a crosslinking agent and sometimes gelation takes place, the above reaction is more preferably carried out before the polyaddition.

Examples of the catalyst used in the reaction include alkali metal hydroxides such as sodium hydroxide, potassium hydroxide, lithium hydroxide and the like; alkali metal alcoholates such as sodium methylate and the like; tertiary amines such as N,N-dimethylbenzylamine, triethylamine, pyridine and the like; quaternary ammonium salt such as tetramethylammonium chloride, benzyltriethylammonium chloride and the like; organic phosphorus compounds such as triphenylphosphine, triethylphosphine and the like; salts of alkali metals such as lithium chloride, lithium bromide and the like; lewis acids such as boron trifluoride, aluminium chloride, tin (IV) chloride, tin 2-ethylhexanoate, zinc benzoate and the like. The amount thereof is preferably from 1 ppm to 1,000 ppm and more preferably from 5 ppm to 500 ppm based on the amount of the product.

In the reaction, it is preferable that a solvent is not used from the viewpoint of a remained solvent. However, a solvent can also be used. Preferable examples of the solvents include aromatic hydrocarbons such as toluene, xylene, ethylbenzene and the like; and ketones such as methylisobutyl ketone, methylethyl ketone and the like.

Examples of epoxy resins (H) include a so-called one-step epoxy resin produced from the above bisphenols and epichlorohydrin and a two-step epoxy resin which is a product of an polyaddition of the one-step epoxy resin and bisphenols (page 30, [New Epoxy Resin] written by Hiroshi Kakiuchi (Shokodo Co., Ltd., 1986)). These epoxy resins may be used singly or in combination of two or more kinds. Also, a mixture in combination of two or more kinds having different number-average molecular weights may be used. When two or more kinds or a mixture in combination of two or more kinds having different number-average molecular weights are used, the ratio (Mw/Mn) of the weight-average molecular weight (Mw) to the number-average molecular weight (Mn) becomes greater, as compared to a case where a single kind is used, thus favorably improving offset resistance. In that case, the number-average molecular weight of a low molecular weight component is preferably from 300 to 3,000, while that of a high molecular weight component is preferably from 3,000 to 10,000.

As the epoxy resin, epoxy resins obtained by replacing the partial or entire bisphenols by the above aromatic diols can also be used.

Examples of the compounds (G) having at least one active hydrogen reacting with an epoxy group in a molecule include monovalent phenols, secondary amine and monovalent carboxylic acids.

Examples of the monovalent phenols include phenol, cresol, isopropyl phenol, octyl phenol, nonyl phenol, dodecyl phenol, xylenol, p-cumyl phenol, α-naphthol, β-naphthol and the like.

Examples of the secondary amines include aliphatic secondary amines such as diethylamine, dipropylamine, dibutylamine, dipentylamine, didodecylamine, distearylamine, diethanolamine, diallylamine and the like; and aromatic ring-containing secondary amines such as N-methylanilin, N-methyltoluidine, N-methylnitroanilin, diphenylamine, ditolylamine, benzyldimethylamine and the like.

Examples of the monovalent carboxylic acids include aliphatic carboxylic acids such as propionic acid, butyric acid, caproic acid, caprylic acid, pelargonic acid, stearic acid and the like; aromatic ring-containing monovalent carboxylic acid such as benzoic acid, toluic acid, α-naphthoic acid, β-naphthoic acid, phenyl acetate and the like.

Examples of the crosslinking agents include polyamines, acid anhydrides, trivalent or higher phenol compounds, trivalent or higher epoxy resins and the like.

Examples of the polyamines include aromatic polyamine, aliphatic polyamine and the like. Preferable examples thereof include diethylene triamine, triethylene triamine, imino bispropylamine, bis(hexamethylene)triamine, trimethylhexamethylene diamine, diethylaminopropylamine, m-xylylenediamine, m-phenylenediamine, diaminodiphenylmethane, diaminodiphenylsulfone and the like.

As the acid anhydride, compounds such as the aforementioned acid anhydrides are preferable.

Examples of the trivalent or higher phenol compound include phenol novolac resin, ortho-cresol novolak resin, 1,1,1-tris(4-hydroxyphenyl)methane, 1,1,3-tris(2-methyl-4-hydroxy-5-tert-butylphenyl)propane, 1,1,3-tris(2-methyl-4-hydroxy-5-tert-butylphenyl)butane, 1-[α-methyl-α-(4-hydroxyphenyl)ethyl]-3-[α,α-bis(4-hydroxyphenyl)ethyl]benzene, and 1-[α-methyl-α-(4-hydroxyphenyl)ethyl]-4-[α,α-bis(4-hydroxyphenyl)ethyl]benzene.

The trivalent or higher epoxy resin is obtained, for example, by the reaction of a trivalent or higher phenol compound or a trivalent or higher alcohol compound with epihalohydrine. Examples of the trivalent or higher phenol compounds include phenol novolac resin, ortho-cresol novolak resin, 1,1,1-tris(4-hydroxyphenyl)methane, 1,1,3-tris(2-methyl-4-hydroxy-5-tert-butylphenyl)propane, 1,1,3-tris(2-methyl-4-hydroxy-5-tert-butylphenyl)butane, 1-[α-methyl-α-(4-hydroxyphenyl)ethyl]-3-[α,α-bis(4-hydroxyphenyl)ethyl]benzene, 1-[α-methyl-α-(4-hydroxyphenyl)ethyl]-4-[α,α-bis(4-hydroxyphenyl)ethyl]benzene and the like. As the trivalent or higher alcohol, there can be exemplified, for example, 1,2,3,6-hexanetetrol, 1,4-sorbitan, pentaerythritol, dipentaerythritol, tripentaerythritol, 1,2,4-butanetriol, glycerol, 2-methylpropanetriol, 2-methyl-1,2,4-butanetriol, trimethylolethane, trimethylolpropane, 1,3,5-trihydroxymethylbenzene and the like.

The polyol based resin is preferably produced by an polyaddition of at least one kind (E) selected from bisphenols (i), polyhydric alcohols (ii), reactants (iii) of the polyhydric alcohols and an acid anhydride, an epoxy resin (F), and a compound (G) having at least one active hydrogen in the molecule which can react with an epoxy group, and optionally a crosslinking agent. In that polyaddition, the amount of the active hydrogen group capable of reacting with an epoxy group is preferably from 0.5 mole equivalent to 2.0 mole equivalents, and further preferably from 0.7 mole equivalent to 1.5 mole equivalent based on 1 mole equivalent of the epoxy group in the system. The amount of less than 0.5 is not preferable because gelation may occur in the system and the reaction may be difficult to control in some cases The amount of greater than 2.0 is not preferable because a lot of the monomers remains at the end of the reaction. The polyol based resin can be produced, for example, by using bisphenol A in an amount of from 0.01 mole to 3 mole, benzoic acid in an amount of from 0.005 mole to 2 mole, stearic acid in an amount of from 0 mole to 0.2 mole, and a reactant of propylene oxide adducts of bisphenol A and phthalic anhydride in an amount of from 0 mole to 1 mole, as compounds having an active hydrogen in the molecule which can react with an epoxy group, based on 2 mole to 3.5 mole of an epoxy resin.

In the preparation of the polyether polyol based resin (D) of the present invention, the polyaddition may be carried out by using a catalyst. Examples of the catalysts include the catalysts which can be used for the reaction of the polyhydric alcohol and acid anhydride. When a catalyst is used in the preparation of the resin of the present invention, the amount is usually from 1 ppm to 1,000 ppm and preferably from 5 ppm to 500 ppm based on the amount of a product.

In the polyaddition for producing the polyol based resin of the present invention, it is preferred that a solvent is not used from the viewpoint of a remained solvent. However, a solvent can also be used. Preferable examples of the solvent include aromatic compounds such as toluene, xylene and the like; and ketones such as 2-butanone, methylisobutyl ketone, cyclohexanone and the like; ethers such as ethylene glycol dibutyl ether, diethylene glycol dimethyl ether, tetrahydrofuran, dioxane, anisole and like; and aprotic polar solvents such as N,N-dimethylformamide, dimethylsulfoxide, 1-methyl-2-pyrrolidone and the like. These solvents can also be used singly or in combination of two or more kinds. In the case of using the solvent, the amount thereof is usually in a proportion of from 1 mass % to 100 mass % and preferably from 5 mass % to 50 mass % of the mass of the raw material to be fed.

The reaction temperature in the polyaddition is different depending on the based or the amount of a catalyst, but it is preferably in the range of 120° C. to 200° C. When the reaction temperature is higher than 200° C., some kinds of catalysts may lose their activities and the resin may be colored remarkably in some cases.

Generally, the reaction can be traced by the epoxy equivalent, softening point, gel permeation chromatography (GPC) or the like. In the present invention, the end point of the reaction is preferably determined by the point where the epoxy group disappears substantially, that is, the epoxy equivalent becomes not less than 20,000 g/Eq. In the present invention, the epoxy equivalent refers to the mass (g) of an epoxy resin per 1 g equivalent of an epoxy group.

In the polyol based resin of the present invention, a number-average molecular weight (Mn) is preferably in the range of 1,000 to 20,000, more preferably in the range of 1,500 to 15,000, and particularly preferably in the range of 2,500 to 5,000. When Mn is less than 1,000, the resin strength and cohesive force of the resin may be deteriorated so that sufficient durability and offset resistance are not exhibited in some cases. When Mn exceeds 20,000, sufficient fixing properties or gloss may not be shown in some cases. Mw/Mn is preferably from 5 to 50 and particularly preferably from 10 to 35. Mw/Mn of less than 5 is not preferable because sufficient offset resistance may not be exhibited. Mw/Mn of more than 50 is not preferable because the high viscosity in the system in the preparation make it difficult to control the reaction.

The softening point is preferably from 85° C. to 150° C. and particularly preferably from 100° C. to 135° C. The softening point mentioned herein is a softening temperature of a sample measured at a heating rate of 1° C./min using a softening point measuring device (FP90, a product of Mettler Toledo K.K.). When the softening point is less than 85° C., it is not preferable from the viewpoint of durability. When the softening point exceeds 135° C., sufficient fixing properties or gloss may not be exhibited in some cases.

A glass transition temperature (Tg) is preferably from 50° C. to 90° C. and particularly preferably from 55° C. to 70° C. from the viewpoints of securing fixing properties, offset resistance and anti-blocking properties.

A hydroxyl value of the polyol based resin used in the present invention is preferably from 100 KOHmg/g to 300 KOHmg/g and more preferably from 150 KOHmg/g to 250 KOHmg/g. By achieving the structure having a plurality of hydroxyl groups on a molecular chain, the cohesive force of a resin is increased due to an inter-molecular hydrogen binding force, thus even a resin having a relatively small molecular weight can exhibit superior performance with regard to development durability. In the present invention, the hydroxyl value refers to mg of potassium hydroxide necessary to neutralize an acid anhydride necessary to esterify the hydroxyl group present in 1 g of the resin.

A urethane modified polyol based resin obtained by chain-extending of polyol based resin using a polyisocyanate is preferably used from the viewpoint of the good offset resistance.

In that case, the polyisocyanate is preferably used in an amount of not more than 0.5 mole equivalent and more preferably not more than 0.3 mole equivalent of an isocyanate group per 1 mole equivalent of the hydroxyl group of the polyol based resin. When it is not less than 0.5 mole equivalent, sufficient fixing properties are not obtained in some cases.

Examples of the polyisocyanates include compounds such as the aforementioned polyisocyanate (b).

Preferred examples of methods for reacting the polyol based resin with a polyisocyanate include a method comprising feeding the polyol based resin into a twin screw extruder for kneading, and then feeding the polyisocyanate into the resin mixture during kneading and conveying for further melt-kneading. Examples of reactors used in the other method than those above include a single screw extruder, a static mixer and a usual reactor with a stirrer.

The preferred range of the reaction temperature is the same as the temperature range in the aforementioned reaction of the polyester resin (a) and the polyisocyanate (b).

In the present invention, in the preparation of an aqueous dispersed system comprising the resin microparticle (A) for a toner raw material dispersed in water, a emulsifying auxiliary may be used along with the resin.

The emulsifying auxiliary in the present invention promotes the formation of an aqueous dispersed system. Any known emulsifying auxiliaries can be used without restrictions.

Preferred Examples of the emulsifying auxiliaries include a sulfonic acid group-containing polyester based resin, a sulfonic acid group-containing vinyl copolymer and their metal salts and their ammonium salts. In addition, thermoplastic resins swollen or dissolved in water such as polyvinyl alcohol, partly saponified polyvinyl alcohol, methylcellulose, carboxymethylcellulose or sodium salts thereof are also preferable. In the present invention, in particular, a sulfonic acid group-containing polyester based resin is suitably used as the emulsifying auxiliary. A sulfonic acid group-containing monomer is preferably contained in an amount of from 3 mole % to 35 mole % based on the total acid components of the sulfonic acid group-containing polyester resin. Several kinds of the above emulsifying auxiliaries may be used in combination.

Examples of the sulfonic acid group-containing monomers as a raw material of the sulfonic acid group-containing polyester based resin include the aforementioned ones. Among these, aromatic dicarboxylic acid metal salts containing a sulfonic acid group is suitably used. The amount thereof is not particularly restricted, but it is preferably not more than 35 mole % and more preferably not more than 25 mole % of the total acid components of a raw material of the sulfonic acid group-containing polyester based resin. Within the above range, water absorption of a toner can be prevented and a toner with excellent electrification stability can be obtained.

As a raw material of the sulfonic acid group-containing polyester based resin, those described above are preferably used.

Tg of the sulfonic acid group-containing polyester based resin and a number-average molecular weight (Mn) of the tetrahydrofuran (THF) soluble component are preferably those as described above.

As other emulsifying auxiliaries anionic surfactants may be used. Examples of the anionic surfactants include anionic surfactants obtained by reacting with basic substances, such as primary higher fatty acid salts, secondary higher fatty acid salt, primary higher alcohol sulfate ester salts, secondary higher alcohol sulfate ester salts, higher alkyl disulfonic acid salts, sulfonated higher fatty acid salts, higher fatty acid sulfate ester salts, higher fatty acid ester sulfonic acid salts, sulfate ester salts of higher alcohol ether, sulfonic acid salts of higher alcohol ether, alkyroled sulfate ester salts of higher fatty acid amide, alkylbenzene sulfonic acid salts, alkylphenol sulfonic acid salts, alkylnaphthalene sulfonic acid salts, alkylbenzoimidazole sulfonic acid salts and the like. More concrete compound names of these surfactants are disclosed, for example, in "Synthetic Surfactant" written by Hiroshi Horiguchi (published by Sankyo Publishing, 1966).

Hereinafter, the toner using the resin microparticle (A) for a toner raw material of the present invention will be illustrated in detail.

To produce the toner of the present invention, a method comprising forming an aggregate of the resin microparticle (A) for a toner raw material and thermally fusing the aggregate is suitably used.

To form the aggregate of the resin microparticle (A) for a toner raw material, conventionally known methods for forming an aggregate can be used without restrictions. As a preferred example, an aggregate is formed by adding water-soluble salts of an alkali metal, an alkali earth metal or aluminium, such as magnesium sulfate, aluminium sulfate, barium chloride, magnesium chloride, calcium chloride, sodium chloride and the like dissolved in water as a coagulant. Further, an aggregate is formed by adding an ionic surfactant as a coagulant. Examples of the above surfactants include alkylbenzene dimethyl ammonium chloride, alkyl trimethyl ammonium chloride, distearyl ammonium chloride and the like.

To form an aggregate in a method for producing the toner of the present invention, in addition to a dispersed system with the resin microparticle for a toner of the present invention dispersed therein, a dispersed system with a releasing agent dispersed therein, a dispersed system with a colorant dispersed therein, a dispersed system with a magnetic powder dispersed therein or the like may be used. In that case, the aforementioned method for forming an aggregate can also be applied. As other methods for forming an aggregate, an aggregate is also formed by charging at least one kind of a dispersed system of a dispersed system with resin microparticle for a toner dispersed therein, a dispersed system with a releasing agent dispersed therein, a dispersed system with a colorant dispersed therein and a dispersed system with a magnetic powder dispersed therein reversely with respect to the other, and then mixing them. Further, these aggregation processes can be used together.

In the present invention, in the case of forming the above aggregate, the aggregate may be formed by multistage process for the purpose of controlling the toner surface structure. For example, after forming an aggregate of a resin microparticle for a toner, a releasing agent and a colorant, a dispersed system with the resin microparticle for a toner of the present invention dispersed therein or a dispersed system comprising other known binder resins or a binder resin and a emulsifying auxiliary is added subsequently for attaching to the aggregate surface in order to prevent a releasing agent or a colorant from being exposed to the toner surface. In that case, a dispersed system with a known binder resin such as a styrene-acrylic binder resin, a polyol based binder resin or the like can also be post-added for attaching to the aggregate surface for controlling the surface.

The above aggregate is preferably subjected to thermal fusion for enhancing stability as a particle. The thermal fusion is preferably carried out at not less than a glass transition temperature or a melting point of the resin constituting the aggregate, and not more than a thermal decomposition temperature of the resin, for 30 minutes to 10 hours according to the target toner shape. Concretely, the temperature is preferably from 40° C. to 180° C. and more preferably from 50° C. to 140° C. The thermal fusion can be carried out using a known heating device or apparatus.

In the production method of the toner of the present invention, as the releasing agent, a known releasing agent having a melting point of from 70° C. to 155° C. can be preferably used. Concrete examples thereof include polyolefins having a low molecular weight such as polyethylene, polypropylene, polybutene and the like; silicones having a softening point by heating; aliphatic amides such as oleamide, erucamide, ricinoleamide, stearylamide and the like; or natural waxes such as ceramic wax, rice wax, sugar wax, urushi wax, beeswax, carnauba wax, candelilla wax, montan wax and the like; a Fisher-Tropsch wax, modified materials thereof and the like. These releasing agents are dispersed in water with an ionic surfactant or a polymer electrolyte such as polymer acid, polymer base and the like, heated to not less than the melting point, and treated using a homogenizer or a pressure discharge type dispersing machine which is capable of applying a strong shearing force, whereby a dispersed system with a releasing agent having a diameter of not more than 1 μm dispersed therein can be obtained.

In the method for producing the toner of the present invention, known dyes and pigments can be used for colorants. Concrete examples thereof include carbon black, magnetite, Phthalocyanine Blue, Peacock blue, Permanent red, lake red, Rhodamine lake, Hansa Yellow, Permanent yellow, benzidine yellow, oil black, azo oil black or the like. More concrete examples thereof include nigrosine dyes (C. I. No. 50415), aniline blue (C. I. No. 50405), charcoal blue (C. I. No. azoec Blue 3), chrome yellow (C. I. No. 14090), ultra marine blue (C. I. No. 77103), Dupont oil red (C. I. No. 26105), Orient oil red #330 (C. I. No. 60505), Quinoline Yellow (C. I. No. 47005), methylene blue chloride (C. I. No. 52015), Phthalocyanine Blue (C. I. No. 74160), Malachite Green oxalate (C. I. No. 42000), lamp black (C. I. No. 77266), rose Bengal (C. I. No. 45435) or the like. In the present invention, a surface-treated colorant obtained by polymerizing a polymerizable monomer in the presence of a colorant can also be used. An aqueous dispersed system of a colorant is obtained, for example, by mixing a colorant and a surfactant, and dispersing the mixture in water according to a known method.

In the method for producing the toner of the present invention, as a charge controlling agent, any known charge controlling agents can be used. Specifically, known charge controlling agents such as nigrosine-based dyes, triphenyl methane-based dyes, quaternary ammonium salt, amine compounds or imine compounds, metal salicylate compounds, metal alkylsalicylate compounds or metal-containing azo dyes can be suitably selected and used accordingly. However, they are preferably hardly dissolved in water from the viewpoint of ionic strength or contamination by waste water.

In the method for producing the toner of the present invention, examples of the magnetic powders include metals such as ferrite, magnetite, reduced iron, cobalt, nickel, manganese and the like, alloys, or compounds comprising these metals.

The compound ratio of a component for toner in the formation of a toner aggregate of the present invention is described below when the total mass of the resin microparticle (A) for a toner raw material of the present invention, a colorant, a charge controlling agent and a releasing agent is 100 mass %. The content of the resin microparticle (A) for a toner raw material of the present invention is from 50 mass % to 99 mass % and more preferably from 60 mass % to 95 mass %. The content of the colorant is preferably from 1 mass % to 25 mass % and more preferably from 1 mass % to 15 mass % from the viewpoint of transparency. Further, the content of the charge controlling agent is usually preferably from 0 mass % to 10 mass %. Further, the content of the releasing agent is preferably from 0 mass % to 20 mass % and more preferably from 0 mass % to 15 mass %. When the amount of the releasing agent is within the above range, the toner has good storage stability. Further, in the present invention, other components than the colorant, charge controlling agent, releasing agent, for example, magnetic powder or the like can be compounded as far as the effect of the present invention is not damaged.

In the present invention, for the purpose of enhancing dispersability to a toner, a colorant, a releasing agent or a charge controlling agent may be added in the preparation of the resin microparticle (A) for a toner raw material of the present invention. The amount thereof is the same as the compound ratio of the component for a toner in the formation of an aggregate.

As described above, a particle obtained via the formation of the resin microparticle (A) for a toner raw material, the formation of an aggregate, a thermal fusion process and proper processes such as washing, drying or the like can be suitably used as a toner.

By adding the surface-treating agent to the surface of the obtained toner for electrostatic development the surface-treating agent exists between the toners and carriers or between the toners. Thus, the powder fluidity and the life of developing agent can be improved. Specific examples of the surface-treating agent include fine powders such as colloidal silica, alumina, titanium oxide, polytetrafluoroethylene, polyvinylidene chloride, polymethyl methacrylate, polystyrene ultrafine particles and silicone Examples of commercial products include AEROSIL 130, 200, 200V, 200CF, 200FAD, 300, 300CF, 380, R972, R972V, R972CF, R974, R976, RX200, R200, R202, R805, R812, R812S, TT600, MOX80, MOX170, COK84, titanium oxide T805 and titanium oxide P25 (these are products of Nippon Aerosil Co., Ltd. and Degussa Japan Co., Ltd.); and CAB-O-SIL L90, LM130, LM150, M5, PTG, MS55, H5, HS5, LM150D, M7D, MS75D, TS720, TS610 and TS530 (these are products of CABOT Corp.). The specific surface area of the surface-treating agent is preferably not less than 30 $m^2/g$, and particularly in the range of 50 $m^2/g$ to 400 $m^2/g$ as measured by nitrogen adsorption by the BET method. The amount of the surface-treating agent added is preferably from 0.1 mass part to 20 mass parts per 100 mass parts of the toner.

The toner obtained by the present invention can be applied to various fixing methods such as a so-called oil-free fixing method, an oil-coated heat roll fixing method, a flash fixing method, an oven fixing method, and a pressure fixing method. The toner according to the present invention can be applied to various cleaning methods, for example, a so-called fur brush method, a blade method or the like. It can also be applied to the image formation method omitting a cleaning process.

EXAMPLES

The present invention is now more specifically illustrated below with reference to Examples and Comparative Examples. Measuring methods for data in each Table are as follows.

(Glass Transition Temperature)

A glass transition temperature in the present invention was measured in accordance with JIS K-7121.

(Acid Value)

In the present invention the acid value was measured by the neutralization titrimetric method. 5 g of the sample was dissolved in 50 ml of a mixed solvent of xylene/dimethyl formamide=1/1 (mass ratio) and several droplets of a phenolphthalane/ethanol solution were added thereto as an indicator and then the resulting mixture was titrated with a 0.1 normal KOH aqueous solution. The acid value (KOHmg/g) was calculated from the titration amount and sample mass at the end point where the color of the sample solution was painted from colorlessness to purple.

(Hydroxyl Value)

In the present invention, the hydroxyl value was measured by the back titration with the acid anhydride. 500 ml of pyridine, 70 g of phthalate and 10 g of imidazole were mixed to prepare a phthalized reagent. 5 ml of the phthalized reagent was added to 2 g of a resin and dissolved therein. Then, the resulting solution was allowed to stand at 100° C. for 1 hour. After that, 1 ml of water, 70 ml of tetrahydrofuran and several droplets of a phenolphthalane-ethanol solution were added to the resin solution and then the resulting mixture was titrated with a 0.4 normal NaOH aqueous solution. The hydroxyl value (KOHmg/g) was calculated from the titration amount and sample mass at the end point where the color of the sample solution was painted from colorlessness to purple.

(Quantitative Analysis of Metals)

In the present invention, quantitative analysis of metals in the resin was performed using an inductively coupled plasma atomic emission spectrometer SPS1200A (a product of Seiko Instruments Inc.).

(Analysis of Content of Bisphenol A-Derived Structure Unit)

In the present invention, the content of the bisphenol A-derived structure unit in the resin was determined by NMR measurement of the hydrolyzed sample.

(Amount of THF Insoluble Component)

In the present invention, the amount of the THF insoluble component was determined according to the following method. A solution of about 5 mass % was prepared by using a resin of about 2.5 g and THF of about 47.5 g. Hereinafter, the concentration of the solution is referred to as "RC." RC was obtained from an precise weighing value of the resin mass and THF mass. Then, the above solution was stirred at 25±3° C. for 12 hours to dissolve the soluble component of the resin completely. Subsequently, the obtained solution was allowed to stand for 16 hours. After the separation of the insoluble component and the supernatant liquid, 5 g of the supernatant liquid was collected and weighed precisely. Then the solution was dried at 150° C. for an hour and the mass of remaining resin was measured. From these values, the concentration of the supernatant liquid "SC" was calculated.

The amount of the THF insoluble component was determined by the following formula from the values of RC and SC.

$$\text{The ratio of THF insoluble component}=[(RC-SC)/RC]\times 100(\%)$$

In the case of measuring the resin microparticle for a toner raw material, the sample obtained by drying an aqueous dispersed system of the resin microparticle at 150° C. for 2 hours and then cooling and solidifying was measured.

(Polyisocyanate-Derived Structure and Vinyl Copolymer-Derived Structure)

In the present invention, existence of a polyisocyanate-derived structure in the THF insoluble component and a vinyl copolymer in the resin microparticle for a toner was confirmed by IR measurement.

(Molecular Weight)

The molecular weight was determined using the gel permeation chromatography (GPC). The measurement was conducted under the following conditions, based on the commercially available monodispersed standard polystyrene.

Detector: SHODEX RI-71S (Refractometer, a product of Showa Denko K.K.)

Mobile phase: Tetrahydrofuran

Column: A piece of KF-G, three pieces of KF-807L and a piece of KF800D, manufactured by Showa Denko K.K., were connected serially.

Flow rate: 1.0 ml/min

Sample: 0.25% THF solution

I The reliability of the measurement was confirmed by checking whether Mw/Mn of NBS706 polystyrene sample (Mw=288,000, Mn=137,000, and Mw/Mn=2.11) measured under the above condition is 2.11±0.10 or not.

(Particle Diameter of Resin Microparticle as Raw Material for Toner)

An average particle diameter of 50% volume (D50), a particle diameter of 10% volume (D10) and a particle diameter of 90% volume (D90) were measured using Microtrac HRA (a product of Microtrac Inc.).

(Particle Diameter of Toner)

A particle diameter of 50% volume of the toner was measured using a coulter counter.

(Content of Organic Solvent)

2 mass parts of 2-paropanol was added to 1 weight part of a toner as a measuring object. The mixture was dispersed using an ultrasonic wave for 30 minutes and kept in a refrigerator (5° C.) for 1 day or more for extracting the solvent in the toner. The supernatant liquid was analyzed using the gas chromatography to weigh the amount of a solvent in the toner. In the case of the microparticle for a toner raw material, a high-density emulsified product obtained using a twin screw extruder was used for the measurement.

Device: Shimadzu GC-14A

Column: CBP20-M 50-0.25

Detector: FID

Injected amount: 1 to 5 μm

Carrier gas: He 2.5 kg/$cm^2$

Hydrogen flow rate: 0.6 kg/$cm^2$

Air flow rate: 0.5 kg/$cm^2$

Chart speed: 5 mm/min

Sensitivity: Range 101× Atten 20

Column temperature: 40° C.

Injection temperature: 150° C.

(Preparation of Resin)

An example using a polyester resin is illustrated.

Resin (A-1-1)

A 5-liter, 4-necked flask was provided with a reflux condenser, a water-separating unit, a nitrogen gas inlet tube, a thermometer and a stirrer. There into were fed 24.0 mole of ACTCOL KB300 (bisphenol A derivative, a product of Mitsui Takeda Chemicals, Inc.), 56.0 mole of ethylene glycol (EG), 10.0 mole of trimethylolpropane (TMP), 4.0 mole of triethylene glycol (TEG), 83.5 mole % of terephthalic acid (TPA) and 18.3 mole of benzoic acid (Benz A). Dehydration and polycondensation were conducted at 180° C. to 240° C. with nitrogen being introduced into the flask to obtain a resin (A-1-1). The physical properties of the resin were shown in Table 1.

Resin (A-1-2) to Resin (A-1-4)

Resins (A-1-2) to (A-1-4) were produced in the same manner as in the preparation of the resin (A-1-1), except that the raw material compositions were changed to the contents in Table 1. The physical properties thereof were shown in Table 1.

TABLE 1

| | | Resin | | | |
|---|---|---|---|---|---|
| | | A-1-1 | A-1-2 | A-1-3 | A-1-4 |
| Raw material (mole part) | KB-300 | 24 | 28.5 | 24 | 0 |
| | TMP | 10 | 5 | 12 | 0 |
| | EG | 56 | 66.5 | 56 | 66 |
| | DEG | 0 | 0 | 0 | 24 |
| | TEG | 4 | 0 | 8 | 10 |
| | TPA | 83.5 | 96.5 | 85 | 60 |
| | Benz A | 18.3 | 25.5 | 0 | 0 |
| | IPA | 0 | 0 | 0 | 20 |
| | 5-sulfoisophthalic acid | 0 | 0 | 0 | 10 |
| Physical properties | Tg (° C.) | 45 | 51 | 36.6 | 49.4 |
| | Hydroxyl value (KOHmg/g) | 22 | 3 | 87.8 | 6.5 |
| | Acid value (KOHmg/g) | 2.1 | 24.7 | 12.8 | 2.5 |

TABLE 1-continued

| | Resin | | | |
|---|---|---|---|---|
| | A-1-1 | A-1-2 | A-1-3 | A-1-4 |
| Mn | 2,800 | 2,400 | 1,830 | 2,400 |
| Mw | 15,600 | 6,000 | 6,330 | 55,000 |

KB-300: Bisphenol A derivative
TMP: trimethylolpropane
EG: ethylene glycol
DEG: diethylene glycol
TEG: triethylene glycol
TPA: terephthalic acid
Benz A: benzoic acid
IPA: isophthalic acid Resin (A-2-1)

A mixture of 70 mass parts of the resin (A-1-1) and 30 mass parts of the resin (A-1-4) was fed into a twin screw extruder at a flow rate of 10 kg/hr for kneading at 175° C. and 3.0 mass parts of tolylene diisocyanate (TDI) was further fed into the resin mixture during kneading and conveying the resin mixture for further kneading to obtain a resin (A-2-1). Tg of the obtained resin was shown in Table 2.

Resin (A-2-2) to Resin (A-2-3)

Resins (A-2-2) and (A-2-3) were produced in the same manner as in the preparation of the resin (A-2-1), except that the raw material compositions were changed to the contents in Table 2. Tg thereof were also shown in Table 2.

TABLE 2

| | Resin | | |
|---|---|---|---|
| | A-2-1 | A-2-2 | A-2-3 |
| Raw material resin (mass part) | A-1-1 70<br>A-1-4 30 | A-1-2 55<br>A-1-3 15<br>A-1-4 30 | A-1-2 70<br>A-1-3 30 |
| TDI (mass part) | 3 | 2.4 | 2.1 |
| Tg (° C.) | 62 | 52 | 54 |

Resin (b1-1)

A 5-liter, 4-necked flask was provided with a reflux condenser, a water-separating unit, a nitrogen gas inlet tube, a thermometer and a stirrer. There into were fed at a ratio of 12.8 mole parts of ACTCOL KB300, 30.0 mole parts of EG, 2.3 mole parts of TMP, 43.5 mole parts of TPA and 11.5 mole parts of Benz A. Dibutyltin oxide was added in an amount of 0.3 mass % based on the total mass of monomers. Dehydration and polycondensation were conducted at 180° C. to 240° C. with nitrogen being introduced into the flask to obtain a resin (b1-1).

The physical properties of the resin were shown in Table 3.

Resin (b1-2) to Resin (b1-3)

Resins (b1-2) and (b1-3) were produced in the same manner as in the preparation of the resin (b1-1), except that the raw material compositions were changed to the contents in Table 3. The physical properties thereof were also shown in Table 3.

Resin (b1-4)

A 5-liter, 4-necked flask was provided with a reflux condenser, a water-separating unit, a nitrogen gas inlet tube, a thermometer and a stirrer. There into were fed 4.2 mole parts of sodium dimethyl 5-sulfoisophthalic acid and 30.5 mole parts of EG. 0.2 mass part of titanium lactate (Orgatics TC-310, a product of Matsumoto Chemical Industry Co., Ltd.) was added thereto for carrying out demethanolation at 180° C. to 220° C. and then 13.7 mole parts of DEG, 6.3 mole parts of TEG, 31.6 mole parts of TPA and 13.7 mole parts of IPA were fed there into. Dehydration and polycondensation were conducted at 180° C. to 240° C. with nitrogen being introduced into the flask to obtain a resin (b1-4). The physical properties of the resin (b1-4) were shown in Table 3.

TABLE 3

| | | Resin | | | |
|---|---|---|---|---|---|
| | | b1-1 | b1-2 | b1-3 | b1-4 |
| Raw material (mole part) | KB-300 | 12.8 | 13.2 | 13 | 0 |
| | Sodium dimethyl 5-sulfoisophthalic acid | 0 | 0 | 0 | 4.2 |
| | EG | 30 | 30.8 | 30.3 | 30.5 |
| | DEG | 0 | 0 | 0 | 13.7 |
| | TEG | 0 | 0 | 4.3 | 6.3 |
| | TMP | 2.3 | 2.3 | 6.5 | 0 |
| | TPA | 43.5 | 47.2 | 45.9 | 31.6 |
| | Benz A | 11.5 | 6.5 | 0 | 0 |
| | IPA | 0 | 0 | 0 | 13.7 |
| Physical properties | Tg (° C.) | 53 | 61 | 37 | 50 |
| | Hydroxyl value (KOHmg/g) | 4.3 | 3 | 87.8 | 3.5 |
| | Acid value (KOHmg/g) | 22.3 | 28 | 12.8 | 2.8 |
| | Mn | 1,500 | 3,400 | 1,800 | 2,500 |
| | Mw | 5,900 | 9,500 | 6,300 | 54,000 |
| | Peak molecular weight | 5,300 | 7,000 | 5,000 | 9,800 |

Resin (b2-1)

40.0 mass parts of xylene was fed into a 5-liter flask purged with nitrogen and heated by an oil bath. Under reflux (internal temperature: 138° C.), a mixture of 78.0 mass parts of styrene, 20.0 mass parts of n-butyl acrylate, 2.0 mass parts of glycidyl methacrylate (corresponding to 2.6 mole parts when the total of all vinyl monomers was 100 mole parts) and 0.5 mass part of di-t-butylperoxide was continuously dropped thereto over 5 hours. Then, the resulting mixture was further reacted for an hour for polymerization. After that, with maintaining the internal temperature at 130° C., 0.5 mass part of di-t-butylperoxide was added thereto and the reaction was carried out for 2 hours to complete the polymerization. The obtained resin was flashed at 190° C. in a vessel under 10 mmHg for removing the solvent to obtain a resin (b2-1). The physical properties of the resin (b2-1) were shown in Table 4.

Resin (b2-2)

A resin (b2-2) was produced in the same manner as in the preparation of the resin (b2-1), except that the raw material compositions were changed to the contents in Table 4. The physical properties thereof were also shown in Table 4.

TABLE 4

| | | Resin | |
|---|---|---|---|
| | | b2-1 | b2-2 |
| Raw material (mass part) | Styrene | 78 | 75 |
| | n-butyl acrylate | 20 | 17 |
| | Glycidyl methacrylate | 2 | 8 |
| Glycidyl methacrylate (mole part) | | 2.6 | 10.2 |
| Physical properties | Tg (° C.) | 57 | 61 |
| | Mn | 8,500 | 6,000 |

Glycidyl methacrylate (mole part): moles of glycidyl methacrylate based on 100 moles of all vinyl monomers.

Resin (b3-1)

A 5-liter, 4-necked flask was provided with a reflux condenser, a water-separating unit, a nitrogen gas inlet tube, a thermometer and a stirrer. Thereinto were fed 14.5 mole parts of NPG, 33.7 mole parts of EG, 33.7 mole parts of TPA, 15.2 mole parts of IPA and 2.9 mole parts of Benz A. 0.2 mass % of titanium lactate (Orgatics TC-310, a product of Matsumoto Chemical Industry Co., Ltd.) based on the total mass of monomers was added thereto. Dehydration and polycondensation were conducted at 180° C. to 240° C. with nitrogen being introduced into the flask to obtain a resin (b3-1). The physical properties of the resin were shown in Table 5.

Resin (b3-2) to Resin (b3-3)

Resins (b3-2) and (b3-3) were produced in the same manner as in the preparation of the resin (b3-1), except that the raw material compositions were changed to the contents in Table 5. The physical properties thereof were also shown in Table 5.

Resin (b3-4)

A 5-liter, 4-necked flask was provided with a reflux condenser, a water-separating unit, a nitrogen gas inlet tube, a thermometer and a stirrer. Thereinto were fed 1.4 mole part of sodium dimethyl 5-sulfoisophthalic acid and 14.5 mole parts of NPG. 0.2 mass % of titanium lactate (Orgatics TC-310, a product of Matsumoto Chemical Industry Co., Ltd.) based on the total mass of monomers was added thereto for carrying out demethanolation at 180° C. to 220° C. Then, 33.7 mole parts of EG, 33.7 mole parts of TPA, 13.7 mole parts of IPA and 2.9 mole parts of Benz A were fed thereinto. Dehydration and polycondensation were conducted at 180° C. to 240° C. with nitrogen being introduced into the flask to obtain a resin (b3-4). The physical properties of the resin (b3-4) were shown in Table 5.

Resin (b3-5)

A resin (b3-5) was produced in the same manner as in the preparation of the resin (b3-4), except that the raw material compositions were changed to the contents in Table 5. The physical properties thereof were also shown in Table 5.

TABLE 5

| | | Resin | | | | |
|---|---|---|---|---|---|---|
| | | b3-1 | b3-2 | b3-3 | b3-4 | b3-5 |
| Raw material (mass part) | Sodium dimethyl 5-sulfoisophthalic acid | 0 | 0 | 0 | 1.4 | 4.8 |
| | NPG | 14.5 | 13.3 | 13.6 | 14.5 | 14.5 |
| | EG | 33.7 | 31 | 31.7 | 33.7 | 33.7 |
| | TEG | 0 | 0 | 4.5 | 0 | 0 |
| | TMP | 0 | 2.3 | 3.6 | 0 | 0 |
| | TPA | 33.7 | 46.5 | 46.6 | 33.7 | 33.7 |
| | IPA | 15.2 | 0 | 0 | 13.7 | 10.4 |
| | Benz A | 2.9 | 7 | | 2.9 | 2.9 |
| Physical properties | Tg (° C.) | 57 | 54 | 45 | 56 | 63 |
| | Hydroxyl value (KOHmg/g) | 2.4 | 5 | 60.2 | 2.5 | 1.5 |

TABLE 5-continued

| | Resin | | | | |
|---|---|---|---|---|---|
| | b3-1 | b3-2 | b3-3 | b3-4 | b3-5 |
| Acid value (KOHmg/g) | 25.4 | 26 | 8.2 | 30 | 32 |
| Mn | 2,600 | 2,600 | 3,900 | 2,300 | 2,100 |
| Mw | 6,400 | 10,000 | 16,400 | 6,000 | 5,800 |
| Peak molecular weight | 6,500 | 6,300 | 8,000 | 6,100 | 5,900 |

Resin (B1-1)

53 mass pans of the resin (b1-1), 17 mass parts of the resin (b1-3) and 30 mass parts of the resin (b1-4) were mixed. The resulting mixture contains 1.4 mole % of a structure unit having a sulfonic acid group in the total of the polycarboxylic acid-derived structure unit and the polyhydric alcohol-derived structure unit constituting the polyester based resin (B). The mixture was fed into a twin screw extruder at a flow rate of 10 kg/hr for kneading at 175° C., and 4.1 mass parts of tolylene diisocyanate (TDI) was fed into the resin mixture during kneading and conveying the resin mixture for further kneading to obtain a resin (B1-1). The physical properties of the resin were shown in Table 6.

Resin (B1-2) to Resin (B1-5)

Resins (B1-2) to (B1-5) were produced in the same manner as in the preparation of the resin (B1-1), except that the raw material compositions were changed to the contents in Table 6. The physical properties thereof were also shown in Table 6.

TABLE 6

| | | Resin | | | | |
|---|---|---|---|---|---|---|
| | | B1-1 | B1-2 | B1-3 | B1-4 | B1-5 |
| Raw material resin (mass part) | | b1-1 53<br>b1-3 17<br>b1-4 30 | b1-2 53<br>b1-3 17<br>b1-4 30 | b1-1 60<br>b1-3 20<br>b1-4 20 | b1-1 45<br>b1-3 15<br>b1-4 40 | b1-1 70<br>b1-3 30 |
| TDI (mass part) | | 4.1 | 4.3 | 3.9 | 2.5 | 2.5 |
| Sulfonic acid group (mole %) | | 1.4 | 1.4 | 1 | 1.9 | 0 |
| Polyisocyanate-derived structure | | Yes | Yes | Yes | Yes | Yes |
| Physical properties | Tg (° C.) | 55.1 | 58.5 | 57.6 | 53.6 | 54.4 |
| | THF insoluble component (mass %) | 6.8 | 9 | 4.3 | 3.5 | 3 |
| | Peak molecular weight | 5,500 | 7,100 | 5,400 | 5,600 | 5,300 |

Sulfonic acid group (mole %): The ratio of a structure unit having a sulfonic acid group in the total of a polycarboxylic acid-derived structure unit and a polyhydric alcohol-derived structure unit constituting a polyester based resin.
Polyisocyanate-derived structure: Existence of a polyisocyanate-derived structure in the THF insoluble component.
Peak molecular weight: Peak molecular weight of the THF soluble component.

Resin (B2-1)

53 mass parts of the resin (b1-1), 14 mass parts of the resin (b1-3) and 30 mass parts of the resin (b1-4) were mixed to prepare a mixture. The mixture contains 1.5 mole % of a structure unit having a sulfonic acid group and/or a sulfonic acid metal salt group in the total of the polycarboxylic acid-derived structure unit and the polyhydric alcohol-derived structure unit constituting polyester. Thereto was mixed 3 mass parts of the resin (b2-1). The resulting mixture was fed into a twin screw extruder at a flow rate of 10 kg/hr for kneading at 175° C., and 4.3 mass parts of TDI was fed into the resin mixture during kneading and conveying the resin mixture for further kneading to obtain a resin (B2-1). The resin (B2-1) contains 3 mass % of a vinyl copolymer, Tg of the obtained resin was 56.0° C. and the THF insoluble component was 7.1 mass %. By IR a polyisocyanate-derived structure was confirmed in the THF insoluble component, and a vinyl copolymer was further confirmed in the resin. The peak molecular weight of the THF soluble component was 5,400.

Resin (B2-2) to Resin (B2-4)

Resins (B2-2) to (B2-4) were produced in the same manner as in the preparation of the resin (B2-1), except that the raw material compositions were changed to the contents in Table 7. The physical properties thereof were also shown in Table 7.

TABLE 7

| | | Resin | | | |
|---|---|---|---|---|---|
| | | B2-1 | B2-2 | B2-3 | B2-4 |
| Raw material resin (mass part) | | b1-1 53<br>b1-3 14<br>b1-4 30<br>b2-1 3 | b1-1 51<br>b1-3 14<br>b1-4 29<br>b2-1 6 | b1-1 53<br>b1-3 14<br>b1-4 30<br>b2-2 3 | b3-1 53<br>b3-3 14<br>b3-5 30<br>b2-1 3 |
| TD (mass part) | | 4.3 | 4.3 | 4.3 | 2.1 |
| Content of sulfonic acid group (mole %) | | 1.5 | 1.5 | 1.5 | 1.5 |
| Content of vinyl copolymer (mass %) | | 3 | 6 | 3 | 3 |
| Polyisocyanate-derived structure | | Yes | Yes | Yes | Yes |
| Physical properties | Tg (° C.) | 56 | 56.3 | 55.8 | 61 |
| | THF insoluble component (mass %) | 7.1 | 7.4 | 7.9 | 7.1 |
| | Peak molecular weight | 5,400 | 5,500 | 5,500 | 6,200 |

Content of vinyl copolymer (mass %): Content of a vinyl copolymer-derived structure in a polyester based resin.

Resin (B3-1)

53 mass parts of the resin (b3-1), 17 mass parts of the resin (b3-3) and 30 mass parts of the resin (b1-4) were mixed. The resulting mixture contains 1.2 mole % of a structure unit having a sulfonic acid group in the total of the polycarboxylic acid-derived structure unit and the polyhydric alcohol-derived structure unit constituting polyester. The mixture was fed into a twin screw extruder at a flow rate of 10 kg/hr for kneading at 175° C., and 2.1 mass parts of TDI was fed into the resin mixture during kneading and conveying the resin mixture for further kneading to obtain a resin (B3-1). In the resin (B3-1), the structure and tin indicated in the formula (1) were not contained. The physical properties of the obtained resin were shown in Table 8.

Resin (B3-2) to Resin (B3-4)

Resins (B3-2) to (B3-4) were produced in the same manner as in the preparation of the resin (B3-1), except that the raw material compositions were changed to the contents in Table 8. The physical properties thereof were shown in Table 8.

TABLE 8

| | | Resin | | | |
|---|---|---|---|---|---|
| | | B3-1 | B3-2 | B3-3 | B3-4 |
| Raw material resin (mass part) | | b3-1 53<br>b3-3 17<br>b1-4 30 | b3-1 53<br>b3-3 17<br>b3-5 30 | b3-2 53<br>b3-3 17<br>b3-5 30 | b3-4 75<br>b3-3 25 |
| TDI (mass part) | | 2.1 | 2.1 | 2.1 | 2.1 |
| Content of sulfonic acid group (mole %) | | 1.2 | 1.4 | 1.4 | 1.1 |
| Polyisocyanate-derived structure | | Yes | Yes | Yes | Yes |
| Bisphenol A-derived structure unit | | No | No | No | No |
| Content of tin (ppm) | | 0 | 0 | 0 | 0 |
| Physical properties | Tg (° C.) | 61 | 60.5 | 60.5 | 55.5 |
| | THF insoluble component (mass %) | 7 | 7.4 | 7.4 | 10 |
| | Peak molecular weight | 6,700 | 6,100 | 6,100 | 6,000 |

Performance as a toner was evaluated according to the following method and criteria.

(Fixing Properties)

An unfixed image was formed using a copier produced by remodeling of a commercial electrophotographic copier. The unfixed image was fixed using a heat roller fixing apparatus produced by remodeling of the fixing section of a commercial copier. The fixing of a toner was conducted at a fixing speed of the heat roll of 210 mm/sec with the temperature of the heat roller being changed at intervals of 5° C. The fixed image obtained was rubbed 10 times by applying a load of 0.5 kgf using a sand eraser (a product of Tombow Pencil Co., Ltd.), and the image densities before and after the rubbing test were measured using a Macbeth reflection densitometer. The lowest fixing temperature at which the change ratio of image density became not less than 60% was taken as the lowest fixing temperature of the toner. The heat roller fixing apparatus used had no silicon oil feeder. The environmental conditions were under normal temperature and normal pressure (temperature=22° C., relative humidity=55%).

1: Lowest fixing temperature≦170° C.

2: 170° C.<lowest fixing temperature≦190° C.

3: 190° C.<Lowest fixing temperature (Offset Resistance)

The offset resistance was evaluated according to the above measurement of the lowest fixing temperature. After an unfixed image was formed using the above copier; the toner image was transferred and fixed using the above heat roller fixing apparatus. Then, a white transfer paper was fed into the heat roller fixing apparatus under the same conditions; and the appearance of toner staining on the transfer paper was examined visually. This operation was repeated by gradually increasing the set temperature of the heat roller of the heat roller fixing apparatus. The lowest set temperature at which toner staining appeared on the transfer paper was taken as the temperature of offset appearance. The atmosphere of the above copier was a temperature of 22° C. and a relative humidity of 55%.

1: 240°≦Temperature of offset appearance

2: 220° C.≦temperature of offset appearance<240° C.

3: Temperature of offset appearance<220° C.

(Cleaning Properties)

After continuous copying of 5,000 copies was conducted under a temperature of 22° C. and a relative humidity of 55% using the above copier contamination of a sensitive material was evaluated visually.

1: Not contaminated at all

2: A little contaminated

3: Fairly contaminated (Storage Stability)

The toner was allowed to stand under the environmental conditions of a temperature of 45° C. and a relative humidity of 60% for 24 hours, and 5 g thereof was fed into a sieve of 150 mesh. Then, the scale of a rheostat of a powder tester (HOSOKAWA POWDER TECHNOLOGY RESEARCH INSTITUTE) was set to 3 for vibrating it for 1 minute. After vibration, the mass remained on the sieve of 150 mesh was measured to obtain the residual mass ratio.

1: Less than 25%

2: Not less than 25% and not more than 40%

3: Greater than 40%

Example 1

91 mass parts of the resin (A-2-1), 5 mass parts of a carbon black REGAL330R (a product of Cabot Specialty Chemicals, Inc), 3 mass parts of refined carnauba wax 1 powder (a product of Nippon Wax Co., Ltd.) and 1 mass part of a charge controlling agent BONTRON S-34 (a product of Orient Chemical Industries, Ltd.) were dispersed and mixed using a Henschel mixer. The resulting material was fed into a twin screw extruder PCM30-41.5 (a product of Ikegai Corporation) at 3.6 kg/hr and melt-kneaded at 140° C., and distilled water was continuously fed from a feeding port placed at a vent section of the extruder at 960 g/hr to obtain an aqueous dispersed system comprising a microparticle dispersed in water. An average particle diameter of 50% volume (D50) of the obtained microparticle was 0.29 μm.

The solid content ratio of the aqueous dispersed system was adjusted to be 20 mass %. 300 g of the aqueous dispersed system and 400 g of 2 weight % sodium chloride aqueous solution were fed into a stainless flask, and stirred and mixed at 30° C. for 30 minutes using CLEARMIX (a product of Emtec Co., Ltd.) to aggregate at a prescribed particle diameter. Then, 800 g of distilled water was added thereto. The resulting material was kept at 90° C. for 6 hours for the thermal fusion, and cooled down to a room temperature, followed by filtering, washing and drying. To 100 mass parts of the solid content obtained in this manner, 0.1 mass part of a hydrophobic silica (Aerosil R972, a product of Nippon Aerosil Co., Ltd.) was added and mixed to obtain a toner. D50 of the obtained toner was 7.5 μm. With regard to the toner, fixing properties and offset resistance were determined using a commercial copier, and the degree of contamination of the heat roller was examined. Further, cleaning properties and storage stability tests were carried out. The results thereof are shown in Table 9.

Example 2

A toner was obtained in the same manner as in Example 1, except that the resin (A-2-2) was used as a raw material and the concentration of the sodium chloride aqueous solution was changed to 1.5 mass %. The evaluation results are shown in Table 9.

Example 3

A toner was obtained in the same manner as in Example 1, except that 64 mass parts of the resin (A-2-3) was used as a raw material and 27 mass parts of WR-901 (a product of Nippon Synthetic Chemical Industry Co., Ltd.) was used as a emulsifying auxiliary. The evaluation results are shown in Table 9.

Example 4

A toner was obtained in the same manner as in Example 1, except that 64 mass parts of the resin (A-2-3) was used as a raw material, 27 mass parts of WR-960 (a product of Nippon Synthetic Chemical Industry Co., Ltd.) was used as a emulsifying auxiliary, 0.1 normal sodium hydroxide aqueous solution was continuously fed from a feeding port placed at a vent section of the extruder at 960 g/hr. The evaluation results are shown in Table 9.

Example 5

A toner was obtained in the same manner as in Example 1, except that 81 mass parts of the resin (A-2-3) was used as a raw material and 10 mass parts of sodium dodecylbenzene sulfonate was used as a emulsifying auxiliary. The evaluation results are shown in Table 9.

Example 6

99 mass parts of the resin (A-2-2) and 1 mass part of a charge controlling agent BONTRON S-34 (a product of Orient Chemical Industries, Ltd.) were dispersed and mixed using a Henschel mixer. Then, the resulting material was fed into a twin screw extruder PCM30-41.5 (a product of Ikegai Corporation) at 3.6 kg/hr and melt-kneaded at 140° C., and distilled water was continuously fed from a feeding port placed at a vent section of the extruder at 960 g/hr to obtain an aqueous dispersed system comprising a microparticle dispersed in water. D50 of the obtained microparticle was 0.23 μm. The solid content ratio of the aqueous dispersed system was adjusted to be 20 mass %.

20.0 mass parts of refined carnauba wax 1 powder (a product of Nippon Wax Co., Ltd.), 2.0 mass parts of Neoperex F-25 (a product of Kao Corporation) and 78.0 mass parts of ion exchange water were heated at 140° C. and emulsified at a discharge pressure of $560\times10^5$ N/$m^2$ using a gaulin homogenizer, and then chilled to obtain an aqueous dispersed system of a releasing agent, D50 of a releasing agent in the dispersed system was 0.12 μm.

20.0 mass parts of a carbon black REGAL330R (a product of Cabot Specialty Chemicals, Inc.), 5.0 mass parts of Neoperex F-25 (a product of Kao Corporation) and 75.0 mass parts of ion exchange water were mixed and dispersed at an oscillating frequency of 28 kHz for 10 minutes using an ultrasonic wave cleaning machine W-113 manufactured by Honda Electronics Co., Ltd. to obtain an aqueous dispersed system of a colorant D50 of a colorant in the dispersed system was 0.15 μm.

270 g of the microparticle aqueous dispersed system, 20 g of the colorant dispersed system, 10 g of the releasing agent dispersed system and 400 g of 2 weight % sodium chloride aqueous solution were fed into a stainless flask and stirred and mixed at 30° C. for 30 minutes using CLEARMIX (a product of Emtec Co., Ltd.) to form an aggregate at a prescribed particle diameter. Then, 800 g of distilled water was added thereto. The resulting material was kept at 90° C. for 6 hours for the thermal fusion, and cooled down to a room temperature, followed by filtering, washing and drying. To 100 mass parts of the obtained solid content, 0.1 mass part of a hydrophobic silica (Aerosil R972, a product of Nippon Aerosil Co., Ltd.) was added and mixed to obtain a toner. An average particle diameter of 50% volume of the obtained toner was 6.5 μm. The evaluation results of the toner are shown in Table 9.

TABLE 9

| | | Example / Comparative Example Nos. | | | | | | |
|---|---|---|---|---|---|---|---|---|
| | | Example 1 | Example 2 | Example 3 | Example 4 | Example 5 | Example 6 | Comparative Example 1 |
| | | Raw material resin | | | | | | |
| | | A-2-1 | A-2-2 | A-2-3 | A-2-3 | A-2-3 | A-2-2 | A-2-1 |
| Resin microparticle | D50 (μm) | 0.29 | 0.3 | 0.29 | 0.35 | 0.31 | 0.23 | — |
| | D90/D10 | 2.1 | 2.1 | 2.1 | 2.1 | 2.1 | 2.1 | — |
| | Content of organic solvent (ppm) | less than 10 | less than 10 | less than 10 | less than 10 | less than 10 | less than 10 | — |
| Toner | D50 (μm) | 7.5 | 6.2 | 6.5 | 7.5 | 6.2 | 6.5 | 11.3 |
| | D90/D10 | 1.5 | 1.5 | 1.5 | 1.5 | 1.5 | 1.5 | 2.1 |
| | Content of organic solvent (ppm) | less than 10 | less than 10 | less than 10 | less than 10 | less than 10 | less than 10 | 840 |
| | Fixing properties | 1 | 1 | 1 | 1 | 1 | 1 | 1 |
| | Offset resistance | 1 | 1 | 1 | 1 | 1 | 1 | 2 |
| | Cleaning properties | 1 | 1 | 1 | 1 | 1 | 1 | 3 |
| | Storage stability | 1 | 1 | 1 | 1 | 1 | 1 | 3 |

Example 7

100 mass parts of the resin (B1-1) was fed into a twin screw extruder PCM30-41.5 (a product of Ikegai Corporation) at 3.6 kg/hr and melt-kneaded at 140° C., and distilled water was continuously fed from a feeding port placed at a vent section of the extruder at 960 g/hr to obtain an aqueous dispersed system of a resin microparticle for a toner. A particle diameter of 50% volume (D50) of the obtained resin microparticle for a toner was 0.32 μm, D90/D10 was 2.1, 5.0 mass parts of the THF insoluble component was included, a polyisocyanate-derived structure in the THF insoluble component was confirmed, and the peak molecular weight of the THF soluble component was 5,500. The ratio of the resin microparticle for a toner in the dispersed system was adjusted to be 30 mass %.

20.0 mass parts of refined carnauba wax 1 powder (a product of Nippon Wax Co., Ltd.), 2.0 mass parts of Neoperex F-25 (a product of Kao Corporation) and 78.0 mass parts of ion exchange water were heated at 140° C. and emulsified at a discharge pressure of $560 \times 10^5$ N/$m^2$ using a gaulin homogenizer, and then chilled to obtain a dispersed system with a releasing agent dispersed therein. An average particle diameter of 50% volume of a releasing agent in the dispersed system was 0.12 µm.

20.0 mass parts of a carbon black REGAL330R (a product of Cabot Specialty Chemicals, Inc.), 5.0 mass parts of Neoperex F-25 (a product of Kao Corporation) and 75.0 mass parts of ion exchange water were mixed and dispersed at an oscillating frequency of 28 kHz for 10 minutes using an ultrasonic wave cleaning machine W-113 manufactured by Honda Electronics Co., Ltd. to obtain a dispersed system with a colorant dispersed therein. An average particle diameter of 50% volume of a colorant in the dispersed system was 0.15 µm.

310 mass parts of the dispersed system comprising a resin microparticle for a toner, 20 g of the colorant dispersed system, 20 mass parts of the releasing agent dispersed system and 500 g of 0.75 weight % sodium hydroxide aqueous solution were fed into a stainless flask and stirred and mixed at 30° C. at 5,000 rpm for 30 minutes using CLEARMIX (a product of Emtec Co., Ltd.). Then, the resulting material was aggregated at 65° C. at 8,000 rpm until a prescribed particle diameter was obtained. Then, 800 mass parts of distilled water was added thereto. The resulting material was kept at 85° C. for 4 hours for the thermal fusion and cooled down to a room temperature, and then 50 mass parts of 0.5 mass % calcium chloride aqueous solution was added thereto, followed by filtering, washing and drying. To 100 mass parts of the obtained solid content, 0.1 mass part of a hydrophobic silica (Aerosil R972, a product of Nippon Aerosil Co, Ltd.) was added and mixed to obtain a toner. An average particle diameter of 50% volume of the obtained toner was 4.7 µm.

Fixing properties and offset resistance of this toner were determined and the degree of contamination of the heat roller was examined. Further, cleaning properties, storage stability and chargeability were determined. The evaluation results are shown in Table 10.

Examples 8 to 10

A microparticle dispersed system and a toner were prepared and evaluated in the same manner as in Example 1, except that the raw materials were changed to the contents in Table 10. The evaluation results are shown in Table 10.

TABLE 10

| | | Example/Comparative Example Nos. | | | | | | | |
|---|---|---|---|---|---|---|---|---|---|
| | | Example 7 | Example 8 | Example 9 | Example 10 | Example 19 | Comparative Example 2 | Comparative Example 3 | Comparative Example 4 |
| | | Raw material resin | | | | | | | |
| | | B1-1 | B1-2 | B1-3 | B1-4 | B1-1 | — | B1-5 | B1-1 |
| Resin microparticle | D50 (µm) | 0.32 | 0.25 | 0.49 | 0.24 | 0.32 | — | — | — |
| | D90/D10 | 2.1 | 2.8 | 3 | 2.1 | 2.1 | — | — | — |
| | Content of organic solvent | less than 10 | less than 10 | less than 10 | less than 10 | less than 10 | — | — | — |
| | Content of THF insoluble component | 5 | 7 | 2.8 | 2 | 5.2 | — | — | — |
| | Polyisocyanate-derived structure | Yes | Yes | Yes | Yes | Yes | — | — | — |
| | Peak molecular weight | 5,500 | 7,000 | 5,400 | 5,500 | 7,000 | — | — | — |
| Toner | D50 (µm) | 4.7 | 5 | 6.3 | 4.9 | 6 | 6.1 | 6.5 | 6 |
| | D90/D10 | 1.5 | 1.5 | 1.5 | 1.5 | 1.5 | 1.5 | 2.1 | 2.8 |
| | Content of organic solvent | less than 10 | less than 10 | less than 10 | less than 10 | less than 10 | 520 | 840 | less than 10 |
| | Fixing properties | 1 | 1 | 1 | 1 | 1 | 2 | 1 | 2 |
| | Offset resistance | 1 | 1 | 1 | 1 | 1 | 3 | 1 | 2 |
| | Cleaning properties | 1 | 1 | 1 | 1 | 1 | 1 | 3 | 1 |
| | Storage stability | 1 | 1 | 1 | 1 | 1 | 1 | 3 | 1 |
| | Charging performance | 1 | 1 | 1 | 1 | 1 | 1 | 2 | 1 |

Example 11

A dispersed system comprising a resin microparticle for a toner and water was obtained in the same manner as in Example 7, except that the resin (B2-1) was used instead of the resin (B1-1). A particle diameter of 50% volume (D50) of the obtained resin microparticle for a toner was 0.30 µm, D90/D10 was 1.5, 5.2 mass parts of the THF insoluble component was included, a polyisocyanate-derived structure in the THF insoluble component was confirmed, a vinyl copolymer in the resin was confirmed, and the peak molecular weight of the THF soluble component was 5,500. Using the dispersed system, a toner was obtained in the same manner as in Example 7. D50 of the obtained toner was 4.7 µm.

Examples 12 to 14

A microparticle dispersed system and a toner were prepared and evaluated in the same manner as in Example 11, except that the raw materials were changed to the contents in Table 11. The evaluation results are shown in Table 11.

TABLE 11

| | | Example/Comparative Example Nos. | | | |
|---|---|---|---|---|---|
| | | Example 11 | Example 12 | Example 13 | Example 14 |
| | | Raw material resin | | | |
| | | B2-1 | B2-2 | B2-3 | B2-4 |
| Resin microparticle | D50 (μm) | 0.3 | 0.35 | 0.31 | 0.32 |
| | D90/D10 | 1.5 | 1.6 | 1.5 | 1.5 |
| | Content of organic solvent | less than 10 | less than 10 | less than 10 | less than 10 |
| | Content of THF insoluble component | 5.2 | 5.8 | 6 | 5.3 |
| | Polyisocyanate-derived structure | Yes | Yes | Yes | Yes |
| | Vinyl copolymer-derived structure | Yes | Yes | Yes | Yes |
| | Peak molecular weight | 5,500 | 5,500 | 5,500 | 6,100 |
| Toner | D50 (μm) | 4.7 | 5.5 | 5 | 4.8 |
| | D90/D10 | 1.5 | 1.5 | 1.5 | 1.5 |
| | Content of organic solvent | less than 10 | less than 10 | less than 10 | less than 10 |
| | Fixing properties | 1 | 1 | 1 | 1 |
| | Offset resistance | 1 | 1 | 1 | 1 |
| | Cleaning properties | 1 | 1 | 1 | 1 |
| | Storage stability | 1 | 1 | 1 | 1 |
| | Charging performance | 1 | 1 | 1 | 1 |

Example 15

An aqueous dispersed system obtained by dispersing a resin microparticle for a toner was obtained in the same manner as in Example 7, except that the resin (B3-1) was used instead of the resin (B1-1). In that resin microparticle, a bisphenol A-derived structure and tin were not included. A particle diameter of 50% volume (D50) of the obtained resin microparticle for a toner was 0.31 μm, D90/D10 was 2.0, 5.3 mass parts of the THF insoluble component was included, a polyisocyanate-derived structure in the THF insoluble component was confirmed, and the peak molecular weight of the THF soluble component was 6,700. Using the dispersed system, a toner was obtained in the same manner as in Example 7. D50 of the obtained toner was 4.9 μm. The evaluation results are shown in Table 12.

Examples 16 to 18

Microparticle dispersed systems and toners were prepared and evaluated in the same manner as in Example 15, except that the raw materials were changed to the contents in Table 12. The evaluation results are shown in Table 12.

TABLE 12

| | | Example/Comparative Example Nos. | | | |
|---|---|---|---|---|---|
| | | Example 15 | Example 16 | Example 17 | Example 18 |
| | | Raw material resin | | | |
| | | B3-1 | B3-2 | B3-3 | B3-4 |
| Resin microparticle | D50 (μm) | 0.31 | 0.29 | 0.29 | 0.4 |
| | D90/D10 | 2 | 2 | 2 | 2.5 |
| | Content of organic solvent (ppm) | less than 10 | less than 10 | less than 10 | less than 10 |
| | Content of THF insoluble component | 5.3 | 5.9 | 5.8 | 7.9 |
| | Polyisocyanate-derived structure | Yes | Yes | Yes | Yes |
| | Peak molecular weight | 6,700 | 6,100 | 6,000 | 6,000 |
| | Bisphenol A-derived structure | No | No | No | No |
| | Content of tin (ppm) | 0 | 0 | 0 | 0 |
| Toner | D50 (μm) | 4.9 | 4.7 | 4.8 | 5.1 |
| | D90/D10 | 1.5 | 1.5 | 1.5 | 1.5 |
| | Content of organic solvent (ppm) | less than 10 | less than 10 | less than 10 | less than 10 |
| | Fixing properties | 1 | 1 | 1 | 1 |
| | Offset resistance | 1 | 1 | 1 | 1 |
| | Cleaning properties | 1 | 1 | 1 | 1 |
| | Storage stability | 1 | 1 | 1 | 1 |
| | Charging performance | 1 | 1 | 1 | 1 |

Example 19

A dispersed system comprising a resin microparticle for a toner and water was obtained in the same manner as in Example 7 using the resin (B1-1). A particle diameter of 50% volume (D50) of the obtained resin microparticle for a toner was 0.32 μm, D90/D10 was 2.1, 7.0 mass parts of the THF insoluble component was included, a polyisocyanate-derived structure in the THF insoluble component was confirmed, and the peak molecular weight of the THF soluble component was 7,000. Using the dispersed system, a toner was obtained in the same manner as in Example 7, except that 0.78% sodium chloride aqueous solution was used. An average particle diameter of 50% volume of the obtained toner was 6.0 μm. The evaluation results are shown in Table 10.

Comparative Example 1

91 mass parts of the resin (A-2-1), 5 mass parts of a carbon black REGAL330R (a product of Cabot Specialty Chemicals, Inc.), 3 mass parts of refined carnauba wax 1 powder (a product of Nippon Wax Co., Ltd.), 1 mass part of a charge controlling agent BONTRON S-34 (a product of Orient Chemical Industries, Ltd.) and 100 mass parts of ethyl acetate were dispersed for 48 hours using a ball mill. 100 mass parts of distilled water was fed into a stainless flask and stirred using CLEARMIX (a product of Emtec Co., Ltd.). While stirring, 50 mass parts of the above dispersion was slowly fed thereinto, and mixed and suspended. Then, the solvent was removed under a reduced pressure, followed by washing and drying. To 100 mass parts of the obtained solid content, 0.1 mass part of a hydrophobic silica (Aerosil R972, a product of Nippon Aerosil Co., Ltd.) was added and mixed to obtain a toner. An average particle diameter of 50% volume (D50) of the obtained toner was 11.3 μm. The evaluation results of the toner are shown in Table 9.

Comparative Example 2

A 5-liter, 4-necked flask was provided with a reflux condenser, a nitrogen gas inlet tube, a thermometer and a stirrer. Thereinto were fed 47.6 mass parts of ion exchange water, 37.0 mass parts of styrene, 3.0 mass parts of n-butyl acrylate, 0.6 mass part of acrylic acid, 2.4 mass parts of dodecanethiol, 0.4 mass part of carbon tetrabromide and 4.0 mass parts of Neoperex F-25 (a product of Kao Corporation). While the resulting material was dispersed and emulsified in the flask and slowly mixed for 10 minutes, 5.0 mass parts of ion exchange water in which 0.4 mass part of ammonium persulfate was dissolved was fed thereinto and the flask was purged with nitrogen. The flask was stirred for carrying out the emulsion polymerization at 70° C. for 5 hours. Thus, a styrene resin dispersion 1 having an average particle diameter of 50% volume of 0.16 nm, Tg of 59° C. and the weight-average molecular weight of 12,000 was obtained.

A 5-liter, 4-necked flask was provided with a reflux condenser, a nitrogen gas inlet tube, a thermometer and a stirrer. Thereinto were fed 50.2 mass parts of ion exchange water, 28.0 mass parts of styrene, 12.0 mass parts of n-butyl acrylate, 0.8 mass part of acrylic acid and 4.0 mass parts of Neoperex F-25 (a product of Kao Corporation). While the resulting material was dispersed and emulsified in the flask and slowly mixed for 10 minutes, 5.0 mass parts of ion exchange water in which 0.3 mass part of ammonium persulfate was dissolved was fed thereinto and the flask was purged with nitrogen. The flask was stirred for carrying out the emulsion polymerization at 70° C. for 5 hours. Thus, a styrene resin dispersion 2 having an average particle diameter of 50% volume of 105 nm, Tg of 53° C. and the weight-average molecular weight of 55,000 was obtained.

20.0 mass parts of refined carnauba wax 1 powder (a product of Nippon Wax Co., Ltd.), 2.0 mass parts of Neoperex F-25 (a product of Kao Corporation) and 78.0 mass parts of ion exchange water were heated at 140° C. and emulsified at a discharge pressure of $560\times10^5$ N/$m^2$ using a gaulin homogenizer, and then chilled to obtain a releasing agent dispersion. An average particle diameter of 50% volume of the releasing agent dispersion was 0.12 μm. Furthermore, 20.0 mass parts of a carbon black REGAL330R (a product of Cabot Specialty Chemicals, Inc.), 5.0 mass parts of Neoperex F-25 (a product of Kao Corporation) and 75.0 mass parts of ion exchange water were mixed and dispersed at an oscillating frequency of 28 kHz for 10 minutes using an ultrasonic wave cleaning machine W-113 manufactured by Honda Electronics Co., Ltd. to obtain a colorant dispersion. An average particle diameter of 50% volume of the colorant dispersion was 0.15 μm.

180 g of the styrene resin dispersion 1, 80 g of the styrene resin dispersion 2, 30 g of the colorant dispersion, 30 g of the releasing agent dispersion and 1.5 g of sanisol B-50 (a product of Kao Corporation) were mixed and dispersed in a circular flask using a homo mixer, and then the flask was stirred in an oil bath and heated up to 50° C. The resulting material was kept at 50° C. for an hour. Thereafter, 9.0 g of Neoperex F-25 was added thereto. Then, the flask was sealed and heated up to 105° C. while stirring, and kept for 3 hours. The mixture was cooled down to a room temperature, followed by filtering, washing and drying. To 100 mass parts of the obtained solid content, 0.1 mass part of a hydrophobic silica (Aerosil R972, a product of Nippon Aerosil Co., Ltd.) was added and mixed to obtain a toner. An average particle diameter of 50% volume of the obtained toner was 6.1 μm. Fixing properties and offset resistance of this toner were determined and the degree of contamination of the heat roller was examined. Further, cleaning properties, storage stability and chargeability were determined. The evaluation results of this toner are shown in Table 10.

Comparative Example 3

A mixture of 15 mass parts of a carbon black REGAL330R (a product of Cabot Specialty Chemicals, Inc.), 3.5 mass parts of γ-(2-aminoethyl)aminopropyltrimethoxysilane (a product of Dow Corning Toray Silicone Co., Ltd.) and 81.5 mass parts of diethylether was dispersed for 5 hours using a ball mill. Then, the pressure was reduced at 50° C. for removing the solvent and pretreatment of the carbon black was carried out. 4 mass parts of the carbon black, 92 mass parts of the resin (B-1-5), 4 mass parts of refined carnauba wax 1 powder (a product of Nippon Wax Co., Ltd.), 150 mass parts of diethylether and 150 mass parts of dichloromethane were dispersed for 24 hours using a ball mill. 500 mass parts of 2% gum Arabic aqueous solution was fed into a stainless flask and stirred using CLEARMIX (a product of Emtec Co., Ltd.). While stirring, 50 mass parts of the above dispersion was slowly introduced. The resulting material was mixed and dispersed at 8,000 rpm for 8 minutes. The dispersion was fed to distilled water of 2,000 mass parts and stirred at 75° C. for 8 hours using a three one motor and then kept at 95° C. for an hour. 1,000 mass parts of distilled water was put thereinto and cooled down to a room temperature, followed by washing and drying. To 100 mass parts of the obtained solid content, 0.1 mass part of a hydrophobic silica (Aerosil R972, a product of Nippon Aerosil Co., Ltd.) was added and mixed to obtain a toner. An average particle diameter of 50% volume of the obtained toner was 6.5 μm. Fixing properties and offset resistance of this toner were determined and the degree of contamination of the heat roller was examined. Further, cleaning properties, storage stability and chargeability were determined. The evaluation results are shown in Table 10.

Comparative Example 4

100 parts of the resin (B1-1), 4.3 parts of a carbon black REGAL330R (a product of Cabot Specialty Chemicals, Inc.) and 4.3 parts of refined carnauba wax 1 powder (a product of Nippon Wax Co., Ltd.) were dispersed and mixed using a Henschel mixer. Then, the resulting material was melt-kneaded at 180° C. using a twin screw extruder PCM-30 (a product of Ikegai Corporation) to obtain a toner composition in the bulk state. The composition after melt-kneading was coarsely ground using a hammer mill. The coarsely ground resin was finely ground using a jet grinder (IDS2, a product of Nippon Pneumatic Co., Ltd.), followed by air classification, to obtain a toner particle. To 100 mass parts of the obtained toner particle, 0.1 mass part of a hydrophobic silica (Aerosil R972, a product of Nippon Aerosil Co., Ltd.) was added and mixed to obtain a toner. An average particle diameter of 50% volume of the obtained toner was 6.0 μm. The evaluation results are shown in Table 10.

(Method for Producing Resin)

A polyether polyol based resin was used as a resin.

Resin (C-1)

A separable flask was provided with a stirrer, a thermometer, a nitrogen inlet and a reflux tube. Thereinto were fed 91 mass parts of polyoxypropylene-(1,1)-2,2-bis(4-hydroxyphenyl)propane (KB-280, a product of Mitsui Takeda Chemicals, Inc.) and 70 mass parts of phthalic anhydride. The resulting material was stirred at an internal temperature of 100° C. until the system became homogeneous. Subsequently, 0.08 mass part of benzyldimethylamine (BDMA) was added as a catalyst, and then heated to 130° C. and reacted for 6 hours. After the reaction mixture was cooled down to not more than 50° C., 110 mass parts of bisphenol A, 340 mass parts of low molecular weight bisphenol A type liquid epoxy resin [EPOMIK (registered trademark) R-140P, a product of Mitsui Chemicals, Inc., epoxy equivalent: 188 (g/Eq)], 128 mass parts of high molecular weight bisphenol A type solid epoxy resin [EPOMIK (registered trademark) R-309, a product of Mitsui Chemicals, Inc., epoxy equivalent: 2,630 (g/Eq)], 52 mass parts of benzoic acid and 9 mass parts of stearic acid were fed thereinto and 0.03 mass part of 50% tetramethylammonium chloride aqueous solution was added thereto at 80° C. After the resulting mixture was reacted at 160° C. for an hour, 0.03 mass part of 50% tetramethylammonium chloride aqueous solution was further added thereto. The reflux tube was replaced by a vacuum distillation unit and the degree of decompression was increased little by little for removing the water. After an hour, the degree of decompression reached 1,333 Pa (10 mmHg). After the mixture was stirred for 2 hours, the pressure in the reaction system was returned to a normal pressure and stirring was continued for 7 hours. At that time, the generated polyol resin was sampled for measuring the epoxy equivalent. The epoxy equivalent was confirmed to be not less than 20,000, and then the generated polyol resin was taken out of the flask to obtain a resin (C-1). The softening point of the obtained resin was 124° C., Tg was 59° C., Mn was 3,400, Mw was 75,000, Mw/Mn was 22, and the hydroxyl value was 158 KOHmg/g.

Resin (C-2)

A separable flask was provided with a stirrer, a thermometer, a nitrogen inlet and a reflux tube. Thereinto were fed 91 mass parts of polyoxypropylene-(1,1)-2,2-bis(4-hydroxyphenyl)propane (KB-280, a product of Mitsui Takeda Chemicals, Inc.) and 70 mass parts of phthalic anhydride. The resulting material was stirred at an internal temperature of 100° C. until the system became homogeneous. Subsequently, 0.08 mass part of benzyldimethylamine (BDMA) was added as a catalyst, and then heated to 130° C. and reacted for 6 hours. After the reaction mixture was cooled down to not more than 50° C., 233 mass parts of bisphenol A, 603 mass parts of low molecular weight bisphenol A type liquid epoxy resin [EPOMIK (registered trademark) R-140P, a product of Mitsui Chemicals, Inc., epoxy equivalent: 188 (g/Eq)], 123 mass parts of high molecular weight bisphenol A type solid epoxy resin [EPOMIK (registered trademark) R-309, a product of Mitsui Chemicals, Inc., epoxy equivalent: 2,630 (g/Eq)], 90 mass parts of benzoic acid and 22 mass parts of stearic acid were fed thereinto and 0.03 mass part of 50% tetramethylammonium chloride aqueous solution was added thereto at 80° C. The resulting mixture was reacted at 160° C. for an hour, and then 0.03 mass part of 50% tetramethylammonium chloride aqueous solution was further added thereto. The reflux tube was replaced by a vacuum distillation unit and the degree of decompression was increased little by little for removing the water. After an hour, the degree of decompression reached 1,333 Pa (10 mmHg). After the mixture was stirred for 2 hours, the pressure in the reaction system was returned to a normal pressure and stirring was continued for 7 hours. At that time, the generated polyol resin was sampled for measuring the epoxy equivalent. The epoxy equivalent was confirmed to be not less than 20,000, and then the generated polyol resin was taken out of the flask to obtain a resin (C-2). The softening point of the obtained resin was 113° C., Tg was 60° C., Mn was 2,900, Mw was 21,000, Mw/Mn was 7.2, and the hydroxyl value was 141 KOHmg/g.

Resin (C-3)

100 mass parts of the resin (C-2) was fed into a twin screw extruder at a flow rate of 10 kg/hr and kneaded at 175° C., and 2.0 mass parts of tolylene diisocyanate (TDI) was fed into the resin mixture during kneading and conveying the resin mixture for further kneading to obtain a resin (C-3). Tg of the obtained resin was 63° C., Mn was 3,000, Mw was 90,000, Mw/Mn was 30, and the hydroxyl value was 136 KOHmg/g.

Emulsifying auxiliary (D-1)

A 5-liter, 4-necked flask was provided with a reflux condenser, a water-separating unit, a nitrogen gas inlet tube, a thermometer and a stirrer. Thereinto were fed 66.0 mole of ethylene glycol (EG), 10.0 mole of triethylene glycol (TEG), 24.0 mole of diethylene glycol (DEG), 60.0 mole of terephthalic acid (TPA), 20 mole of isophthalic acid (IPA) and 20.0 mole of sodium 5-sulfoisophthalic acid. Dehydration and polycondensation were conducted at 180° C. to 240° C. with nitrogen being introduced into the flask to obtain a emulsifying auxiliary (D-1). Tg of (D-1) was 47° C., Mn was 2,300 and Mw was 50,000.

Herein, performance as a toner was evaluated as follows.

(Fixing Properties)

An unfixed image was formed using a copier produced by remodeling of a commercial electrophotographic copier. The unfixed image was fixed using a heat roller fixing apparatus produced by remodeling of the fixing section of a commercial copier. The fixing of a toner was conducted at a fixing speed of the heat roll of 190 mm/sec with the temperature of the heat roller being changed at intervals of 5° C. The fixed image obtained was rubbed 6 times by applying a load of 1.0 kgf using a sand eraser (a product of Tombow Pencil Co., Ltd.), and the image densities before and after the rubbing test were measured using a Macbeth reflection densitometer. The lowest fixing temperature at which the change ratio of image density became not less than 60%, was taken as the lowest fixing temperature of the toner. The heat roller fixing apparatus used had no silicon oil feeder. The environmental conditions were under normal temperature and normal pressure (temperature=22° C., relative humidity=55%).

(Evaluation Criteria)

1: Lowest fixing temperature≦160° C.

2: 160° C.<Lowest fixing temperature (Offset Resistance)

The offset resistance was evaluated according to the above measurement of the lowest fixing temperature. After an unfixed image was formed using the above copier; the toner image was transferred and fixed using the above heat roller fixing apparatus. Then, a white transfer paper was fed into the heat roller fixing apparatus under the same conditions; and the appearance of toner staining on the transfer paper was examined visually. This operation was repeated by gradually increasing the set temperature of the heat roller of the heat roller fixing apparatus. The lowest set temperature at which toner staining appeared on the transfer paper was taken as the temperature of offset appearance. The atmosphere of the above copier was a temperature of 22° C. and a relative humidity of 55%.

(Evaluation Criteria)

1: 170° C.≦Temperature of offset appearance

2: Temperature of offset appearance<170° C.

(Gloss)

According to the above measurement of the lowest fixing temperature, a solid image fixed at 150° C. was formed and gloss was measured at an incident angle of 75 degrees using a gloss meter GM-3D (a product of Murakami Color Research Laboratory).

(Evaluation Criteria)

1: 10%≦Gloss

2: Gloss<10%

(Cleaning Properties)

After conducting continuous copying of 5,000 copies at 22° C. and a relative humidity of 55% using the above copier, contamination of a sensitive material was visually examined.

(Evaluation Criteria)

1: Not contaminated at all

2: Contamination confirmed (Storage Stability)

The toner was allowed to stand for 24 hours under the environmental conditions of a temperature of 40° C. and a relative humidity of 60%, and 5 g thereof was fed into a sieve of 150 mesh. Then, the scale of a rheostat of a powder tester (HOSOKAWA POWDER TECHNOLOGY RESEARCH INSTITUTE) was set to 3 for vibrating it for 1 minute. After vibration, the mass remained on the sieve of 150 mesh was measured to obtain the residual mass ratio.

(Evaluation Criteria)

1: Residual mass ratio<25%

2: 25%≦Residual mass ratio

Example 20

64.8 mass parts of the resin (C-1), 27.8 mass parts of the emulsifying auxiliary (D-1), 5 mass parts of a cyanine dye FG7351 (a product of Toyo Ink Mfg. Co., Ltd.) and 2.3 mass parts of refined carnauba wax 1 powder (a product of Nippon Wax Co., Ltd.) were dispersed and mixed using a Henschel mixer. The resulting material was fed into a twin screw extruder PCM30-41.5 (a product of Ikegai Corporation) at 3.6 kg/hr and melt-kneaded at 100° C., and distilled water was continuously fed from a feeding port placed at a vent section of the extruder at 1.3 kg//hr to obtain a microparticle aqueous dispersion. An average particle diameter of 50% volume of the obtained microparticle aqueous dispersion was 0.6 μm. The solid content of the microparticle aqueous dispersion was adjusted to be 30 mass %. 200 g of the microparticle aqueous dispersion and 200 g of 0.5 mass % sodium hydroxide aqueous solution were fed into a stainless flask, and stirred and mixed at 30° C. for 30 minutes using CLEARMIX (a product of Emtec Co., Ltd.). Then, 350 g of distilled water was added thereto. The resulting material was kept at 70° C. for 6 hours for the aggregation and fusion, and cooled down to a room temperature, followed by filtering, washing and drying. To 100 mass parts of the solid content obtained in this manner, 0.1 mass part of a hydrophobic silica (Aerosil R972, a product of Nippon Aerosil Co., Ltd.) was added and mixed to obtain a toner. An average particle diameter of 50% volume of the obtained toner was 7.2 μm. For this toner, fixing properties and offset property were determined by using a commercial copier, and gloss was examined. Further, cleaning properties and storage stability tests were carried out. The results thereof are shown in Table 13 along with those of other Examples and Comparative Examples.

Examples 21 and 22

Toners were obtained in the same manner as in Example 20, except that the raw materials illustrated in Table 13 were used.

Example 23

A toner was obtained in the same manner as in Example 20, except that a nichigo polyester WR-901 (a product of The Nippon Synthetic Chemical Industry Co., Ltd.), i.e., a polyester containing a sulfonic acid group was used instead of the emulsifying auxiliary (D-1). The evaluation results are shown in Table 13.

Example 24

A toner was obtained in the same manner as in Example 20, except that a nichigo polyester W-0223 (a product of The Nippon Synthetic Chemical Industry Co., Ltd.), i.e., a polyester containing a sulfonic acid group was used instead of the emulsifying auxiliary (D-1). The evaluation results are shown in Table 13.

Example 25

64.8 mass parts of the resin (C-1) and 27.8 mass parts of a nichigo polyester W-0223 (a product of The Nippon Synthetic Chemical Industry Co., Ltd.), i.e., a polyester containing a sulfonic acid group were fed into a twin screw extruder PCM30-41.5 (a product of Ikegai Corporation) at 3.6 kg/hr and melt-kneaded at 120° C., and distilled water was continuously fed from a feeding port placed at a vent section of the extruder at 1.3 kg//hr to obtain a microparticle aqueous dispersion. An average particle diameter of 50% volume of the obtained microparticle aqueous dispersion was 0.5 μm. The solid content of the microparticle aqueous dispersion was adjusted to be 20 mass %. Furthermore, 20.0 mass parts of refined carnauba wax 1 powder (a product of Nippon Wax Co., Ltd.), 2.0 mass parts of Neoperex F-25 (a product of Kao Corporation) and 78.0 mass parts of ion exchange water were heated at 140° C. and emulsified at a discharge pressure of $560\times10^5$ N/m$^2$ using a gaulin homogenizer, and then chilled to obtain a releasing agent dispersion. An average particle diameter of 50% volume of this releasing agent dispersion was 0.12 μm. Further, 20.0 mass parts of a cyanine dye FG7351 (a product of Toyo Ink Mfg. Co., Ltd.), 5.0 mass parts of Neoperex F-25 (a product of Kao Corporation) and 75.0 mass parts of ion exchange water were mixed and dispersed at an oscillating frequency of 28 kHz for 10 minutes using an ultrasonic wave cleaning machine W-113 (a product of Honda Electronics Co., Ltd.) to obtain a colorant dispersion. An average particle diameter of 50% volume of this colorant dispersion was 0.15 μm. 270 g of the microparticle aqueous dispersion, 20 g of the colorant dispersion, 10 g of the releasing agent dispersion and 400 g of 2 mass % sodium hydroxide aqueous solution were fed into a stainless flask, and stirred and mixed at 30° C. for 30 minutes using CLEARMIX (a product of Emtec Co., Ltd.). Then, 800 g of distilled water was added thereto. The resulting material was kept at 70° C. for 6 hours for the aggregation and fusion, and cooled down to a room temperature, followed by filtering, washing and drying. To 100 mass parts of the obtained solid content, 0.1 mass part of a hydrophobic silica (Aerosil R972, a product of Nippon Aerosil Co., Ltd.) was added and mixed to obtain a toner. The evaluation results are shown in Table 14.

Example 26

A toner was obtained in the same manner as in Example 20, except that a magenta dye TONER MAGENTA E02 (a product of Clariant Ltd.) was used instead of the cyanine dye FG7351 (a product of Toyo Ink Mfg. Co., Ltd.) and emulsifying auxiliary W-0223 was used instead of emulsifying auxiliary D-1. The evaluation results are shown in Table 14.

Example 27

A toner was obtained in the same manner as in Example 20, except that a yellow dye TONER YELLOW HG VP2155 (a product of Clariant Ltd.) was used instead of the cyanine dye FG7351 (a product of Toyo Ink Mfg. Co., Ltd.) and emulsifying auxiliary W-0223 was used instead of emulsifying auxiliary D-1. The evaluation results are shown in Table 14.

Comparative Example 5

92 mass parts of the resin (C-1), 5 mass parts of a cyanine dye FG7351 (a product of Toyo Ink Mfg. Co., Ltd.), 3 mass parts of refined carnauba wax 1 powder (a product of Nippon Wax Co., Ltd.) and 200 mass parts of ethyl acetate were dispersed for 48 hours using a ball mill. 200 mass parts of distilled water and 100 mass parts of 10% tricalcium phosphate slurry were fed into a stainless flask and stirred using CLEARMIX (a product of Emtec Co., Ltd.). While stirring, 100 mass parts of the above dispersion was slowly fed, and mixed and suspended. Thereafter, the solvent and tricalcium phosphate were removed under a reduced pressure and the resulting material was washed and dried. To 100 mass parts of the obtained solid content, 0.1 mass part of a hydrophobic silica (Aerosil R972, a product of Nippon Aerosil Co., Ltd.) was added and mixed to obtain a toner. The evaluation results are shown in Table 14.

TABLE 13

| | | Example/Comparative Example Nos. | | | | |
|---|---|---|---|---|---|---|
| | | Example 20 | Example 21 | Example 22 | Example 23 | Example 24 |
| | | Raw material resin | | | | |
| | | C-1 | C-2 | C-3 | C-1 | C-1 |
| | | Emulsifying auxiliary | | | | |
| | | D-1 | D-1 | D-1 | WR-901 | W-0223 |
| Resin microparticle | D50 (μm) | 0.6 | 1.1 | 0.5 | 0.9 | 0.6 |
| | D90/D10 | 2.8 | 2.8 | 2.8 | 2.8 | 2.8 |
| | Content of organic solvent (ppm) | less than 10 | less than 10 | less than 10 | less than 10 | less than 10 |
| Toner | D50 (μm) | 7.2 | 6.0 | 6.5 | 7.1 | 7.3 |
| | D90/D10 | 1.5 | 1.5 | 1.5 | 1.5 | 1.5 |
| | Content of organic solvent (ppm) | less than 10 | less than 10 | less than 10 | 1 10 | less than 10 |
| | Fixing properties | 1 | 1 | 1 | 1 | 1 |
| | Offset resistance | 1 | 1 | 1 | 1 | 1 |
| | Cleaning properties | 1 | 1 | 1 | 1 | 1 |
| | Storage stability | 1 | 1 | 1 | 1 | 1 |
| | Gloss | 1 | 1 | 1 | 1 | 1 |

TABLE 14

| | | Example/Comparative Example Nos. | | | |
|---|---|---|---|---|---|
| | | Example 25 | Example 26 | Example 27 | Comparative Example 5 |
| | | Raw material resin | | | |
| | | C-1 | C-1 | C-1 | C-1 |
| | | Emulsifying auxiliary | | | |
| | | W-0223 | W-0223 | W-0223 | — |
| Resin microparticle | D50 (μm) | 0.5 | 0.5 | 0.6 | — |
| | D90/D10 | 2.8 | 2.8 | 2.8 | — |
| | Content of organic solvent (ppm) | less than 10 | less than 10 | less than 10 | — |
| Toner | D50 (μm) | 6.5 | 7.3 | 7.3 | 11.3 |
| | D90/D10 | 1.5 | 1.5 | 1.5 | 2.1 |
| | Content of organic solvent (ppm) | less than 10 | less than 10 | less than 10 | 840 |
| | Fixing properties | 1 | 1 | 1 | 1 |
| | Offset resistance | 1 | 1 | 1 | 1 |
| | Cleaning properties | 1 | 1 | 1 | 2 |
| | Storage stability | 1 | 1 | 1 | 2 |
| | Gloss | 1 | 1 | 1 | 1 |

A microparticle aqueous dispersion and a toner obtained by the aggregation and fusion of the microparticle aqueous dispersion according to the present invention are confirmed to have excellent fixing properties, offset resistance, gloss, cleaning properties and storage stability.

The invention claimed is:

1. A process for producing resin microparticles (A) for a toner raw material comprising:

melt-mixing a resin with water, wherein the water is present in an amount of from 5 mass % to 50 mass % based on the total amount of the resin and water, and carrying out phase inversion in one twin screw extruder so as to form an aqueous dispersed system from the extruder comprised of the resin microparticles, the resin microparticles (A) satisfying all of the following requirements (i) to (iii):

requirement (i): A particle diameter of 50% volume (D50) satisfies the relationship 0.05 μm<D50<1 μm;

requirement (ii): A particle diameter of 10% volume (D10) and a particle diameter of 90% volume (D90) satisfy the relationship D90/D10<7; and requirement (iii): The content of an organic solvent is not more than 70 ppm, wherein the resin is a polyester based resin (B1) having a sulfonic acid group.

2. The process for producing the resin microparticles (A) for a toner raw material according to claim 1, wherein the polyester based resin (B1) is a polyester based resin (B11) having a vinyl based copolymer-derived structure (C).

3. The process for producing the resin microparticles (A) for a toner raw material according to claim 1, wherein the polyester based resin (B1) is a polyester based resin (B12) which does not contain a bisphenol A-derived structure unit and has the content of tin derived from a catalyst by which the polyester based resin (B12) is produced of not more than 5 ppm.

4. The process for producing the resin microparticles (A) for a toner raw material according to claim 1, wherein the melting temperature of the resin is from 80° C. to 180° C.

5. A process for producing resin microparticles (A) for a toner raw material comprising:

melt-mixing a resin with water, wherein the water is present in an amount of from 5 mass % to 50 mass % based on the total amount of the resin and water, and carrying out phase inversion in one twin screw extruder so as to form an aqueous dispersed system from the extruder comprised of the resin microparticles, the resin microparticles (A) satisfying all of the following requirements (i) to (iii):

requirement (i): A particle diameter of 50% volume (D50) satisfies the relationship 0.05 μm<D50<1 μm;

requirement (ii): A particle diameter of 10% volume (D10) and a particle diameter of 90% volume (D90) satisfy the relationship D90/D10<7; and requirement (iii): The content of an organic solvent is not more than 70 ppm, wherein the resin comprises a polyether polyol based resin (D).

6. The process for producing the resin microparticles (A) for a toner raw material according to claim 5, wherein the melting temperature of the resin is from 80° C. to 180° C.

* * * * *